Figure 1:
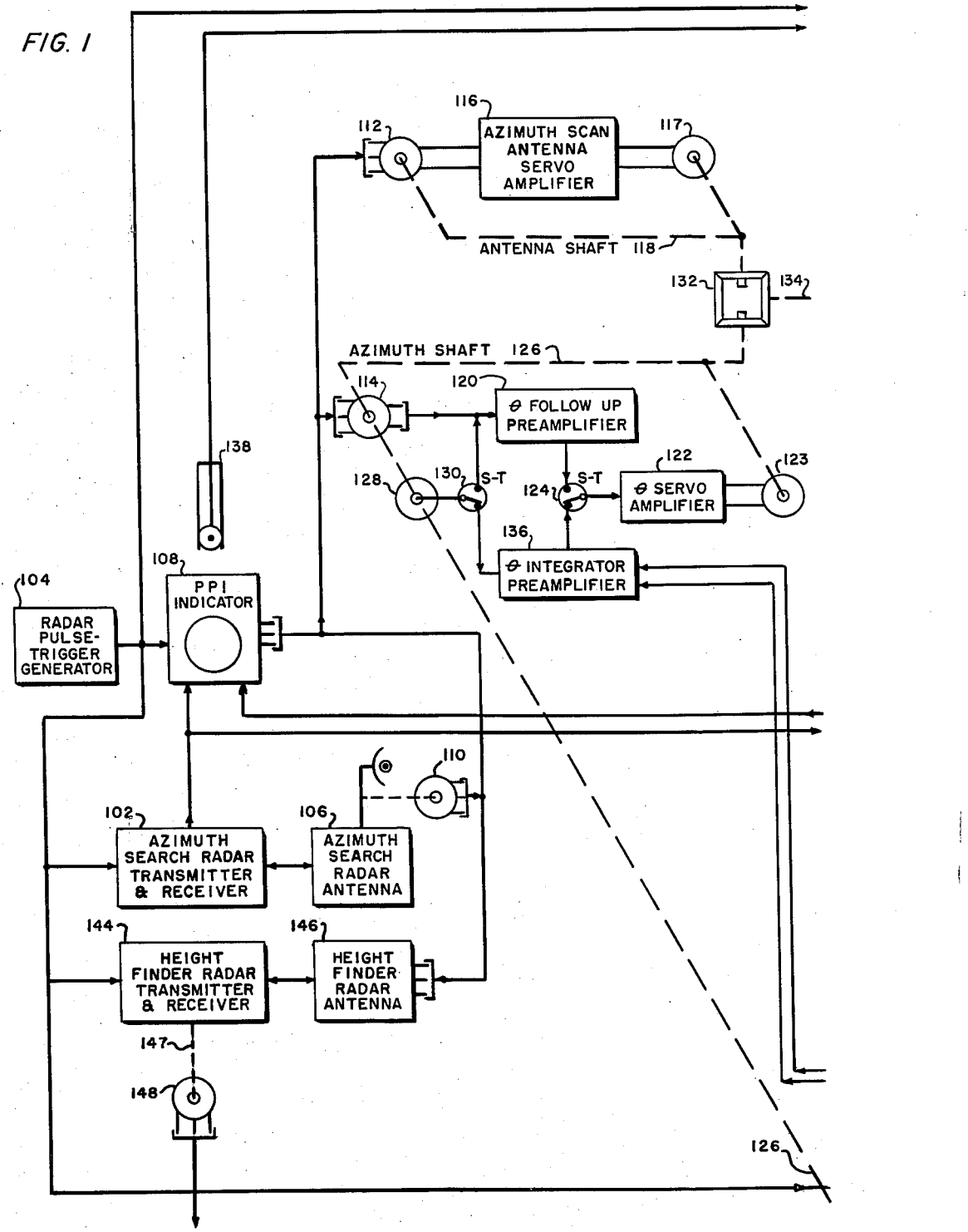

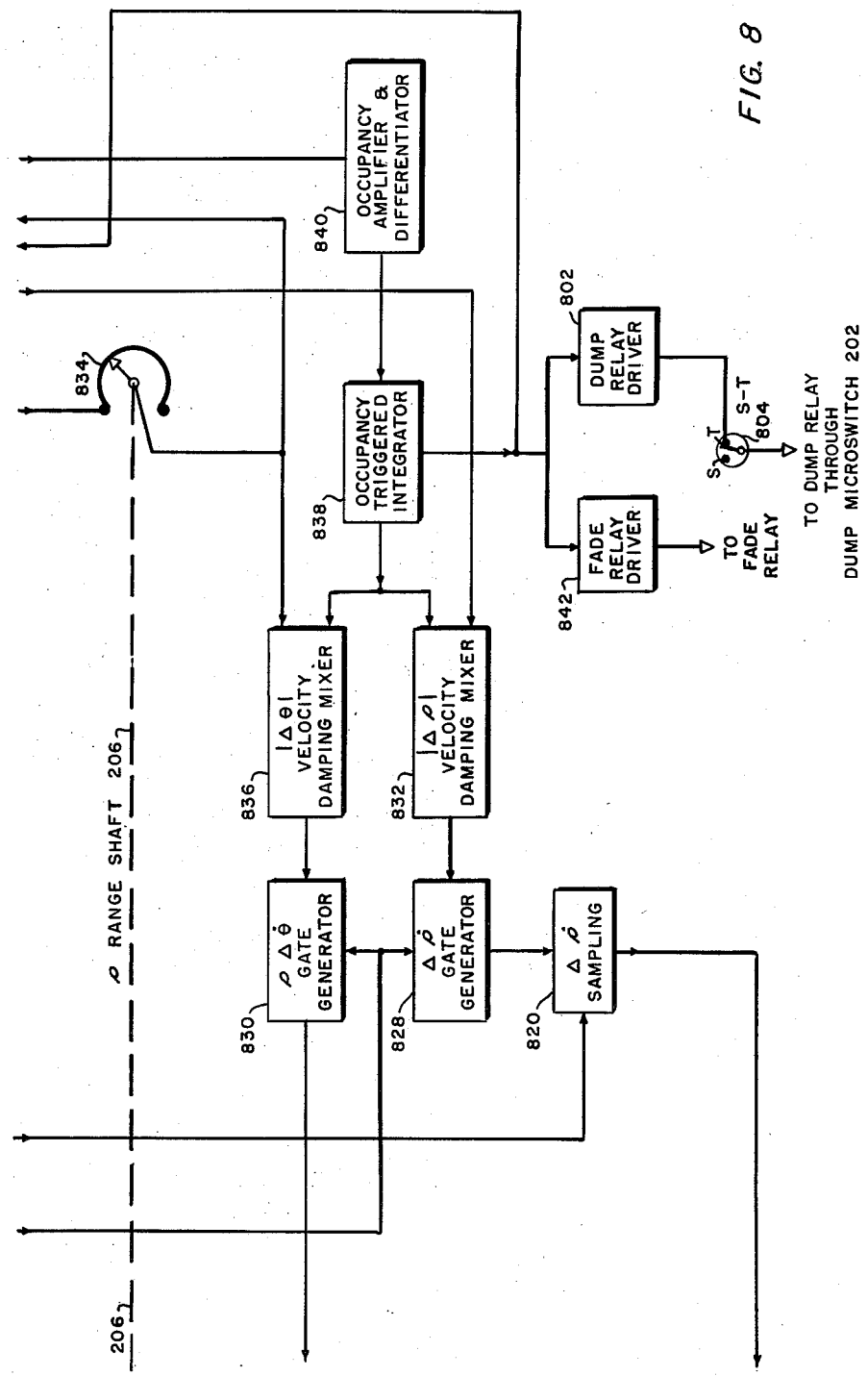

Nov. 13, 1962  R. N. CLOSE  3,064,250
AUTOMATIC TRACK-WHILE-SCAN CHANNEL
Filed May 9, 1955  12 Sheets-Sheet 9

INVENTOR,
RICHARD N. CLOSE.
BY
Harry M. Saragovitz
ATTORNEY

INVENTOR,
RICHARD N. CLOSE.
BY
*Harry M. Saragovitz*
ATTORNEY.

Nov. 13, 1962  R. N. CLOSE  3,064,250
AUTOMATIC TRACK-WHILE-SCAN CHANNEL
Filed May 9, 1955  12 Sheets-Sheet 11

INVENTOR,
RICHARD N. CLOSE.
BY
Harry M. Saragovitz
ATTORNEY.

Nov. 13, 1962   R. N. CLOSE   3,064,250
AUTOMATIC TRACK-WHILE-SCAN CHANNEL
Filed May 9, 1955   12 Sheets-Sheet 12

*INVENTOR,*
*RICHARD N. CLOSE.*
BY
*Harry M. Saragovitz*
ATTORNEY.

3,064,250
AUTOMATIC TRACK-WHILE-SCAN CHANNEL
Richard N. Close, Garden City, N.Y., assignor to the United States of America as represented by the Secretary of the Army
Filed May 9, 1955, Ser. No. 507,749
15 Claims. (Cl. 343—7.3)

The invention disclosed herein relates generally to an automatic track-while-scan channel for use with a search radar object locating system and, more particularly, to an improved track-while-scan channel which automatically alters its operating parameters to fit the tracking conditions which exist at the moment.

Automatic track-while-scan channels are used in conjunction with search radar sets providing a plan position indication of surrounding targets in terms of their range and azimuth. The search radar set performs its usual search function and, in addition, provides range and azimuth data of a selected target to the track-while-scan channel each time the antenna of the search radar set sweeps through the selected target. In addition, a height finder radar set often used with the search radar is also used to provide height data of the selected target to the track-while-scan channel. The data thus obtained which relates to the selected target, may then be used to track that target and no others.

A track-while-scan channel is basically an analogue computer with range, azimuth, and velocity memory. Automatic tracking is accomplished by determining target velocity from the difference between past and present target range and azimuth, and utilizing the target velocity to predict future target range and azimuth. The tracking circuits are corrected with the difference between this predicted target position and the observed target position on the basis of the data received from the radar sets.

In order to ensure that the track-while-scan channel "looks" only at the selected target and does not respond to signals from targets other than the selected target, a track-while-scan channel is provided with range and azimuth gates disposed symmetrically about the predicted range and azimuth. Previously it hs been found that the use of narrow gates increases the resolution of the track-while-scan channel. However, the use of narrow gates makes it difficult to retain the selected target within the gates during periods of rapid maneuvering. Therefore, in the past the width of the track-while-scan gates was chosen as a compromise between these two factors. Even so, the selected target was often lost from the gates during periods of fast maneuvering and once lost was impossible to recover.

Another problem which was encountered was that at times interferences caused by side lobes, adjacent targets, clouds, noise, etc., produced excessive signal strength falling within the gates and, since it was impossible to distinguish the signal from the selected target during these interference periods, the selected target was lost from the gates.

It was also found that in tracking moving targets the track-while-scan channel exhibited large output fluctuations which theoretical investigation attributed to glint effect inherent in the radar target echo signals. This caused the track-while-scan channel to be prone to hunting and to eventually lose the target.

Briefly, this invention contemplates a track-while-scan channel which has both a search and a track mode of operation and which, when in its track mode of operation, eliminates or at least minimizes the problems inherent in prior track-while-scan channels. The track-while-scan channel is switched from its search mode of operation to its track mode of operation by selecting the particular target to be tracked. The selection is accomplished by placing a light gun over the indication of a selected target on the plan-position-indicator of the search radar set and depressing a button thereon as the electron beam of the plan-position-indicator sweeps through the indication of the selected target. The light gun employs a photocell to produce a pulse to operate a relay system to automatically place the track-while-scan channel in operation to track the selected target.

The problem of the optimum width of the range and azimuth gates, mentioned above, is solved in the system constructed in accordance with the principles of this invention by providing both wide and narrow range and azimuth gates. The width of the wide range and azimuth gates is automatically varied to fit the conditions which actually exist at the moment, and a choice is automatically made between wide gate and narrow gate operation independently in both range and azimuth.

In addition, if the target should fade, that is be lost from the gates, or if there is excessive integrated signal strength in the gates due to interference, the tracking channel automatically coasts and continues to predict target position from the last previous information as to the movement of the target until the target reappears in the gates or the interference ends. Should coasting continue for more than a preselected number of target scans, the track-while-scan channel will automatically dump the target and will revert to its search mode of operation.

Further, the large output fluctuations in the output of prior track-while-scan channels could be eliminated by heavily damping the error response of the track-while-scan channel. This permitted averaging the fluctuation errors and would thus provide a smoothed output of higher accuracy than the individual corrections themselves. Although heavy damping worked well so long as the selected target was moving in a straight line at a constant speed, a track-while-scan channel employing heavy damping will soon lose a maneuvering target, will have great difficulty in acquiring any moving target, and will have large acceleration and velocity error lags most of the time.

The track-while-scan channel of this invention overcomes this last difficulty by automatically varying the amount of damping in the velocity error response elements to provide heavy damping when the target velocity is constant and little or no damping when the target is being acquired, when it is maneuvering, or immediately after the track-while-scan channel has been coasting.

Since the data obtained from the search radar sets is only reliable between certain minimum and maximum ranges, the improved track-while-scan channel automatically dumps the selected target when the target gets closer than this minimum range or further away than this maximum range and causes the track-while-scan channel to revert to its search mode of operation.

It is therefore an object of this invention to provide a track-while-scan channel that automatically alters its operating parameters to suit the existing tracking conditions.

It is a further object of the invention to provide a track-while-scan channel having a search mode of operation and a track mode of operation.

It is a further object of this invention to provide a track-while-scan channel which can be semi-automatically switched from its search mode of operation to its track mode of operation in response to the choice of a single echo from any selected target by the operator and will thereafter track that target so long as favorable tracking conditions exist.

It is a further object of this invention to provide a track-while-scan channel which generates both wide and narrow range and azimuth gates.

It is a further object of this invention to provide a track-while-scan channel which automatically utilizes both wide gate and narrow gate operation independently in both range and azimuth.

It is a further object of this invention to provide a track-while-scan channel which automatically determines the width of both the wide range and azimuth gates to provide at all times the optimum compromise between system, resolution, and retention of the target within the gates.

It is a further object of this invention to provide a track-while-scan channel which automatically varies the width of the narrow and wide azimuth gates as a function of the range of the target.

It is a further object of this invention to provide a track-while-scan channel which coasts or continues to predict target movement for a preselected consecutive number of scans following the disappearance of the target from the tracking gates.

It is a further object of this invention to provide an automatic track-while-scan channel which automatically shows both fast undamped response or weighted damping response on the basis of the appearance or disappearance of the target and of the weighted tracking error history.

It is a further object of this invention to provide a track-while-scan channel which automatically ceases tracking operation and reverts to search operation when conditions are not suitable to provide data for tracking of the selected target.

Figure 2:
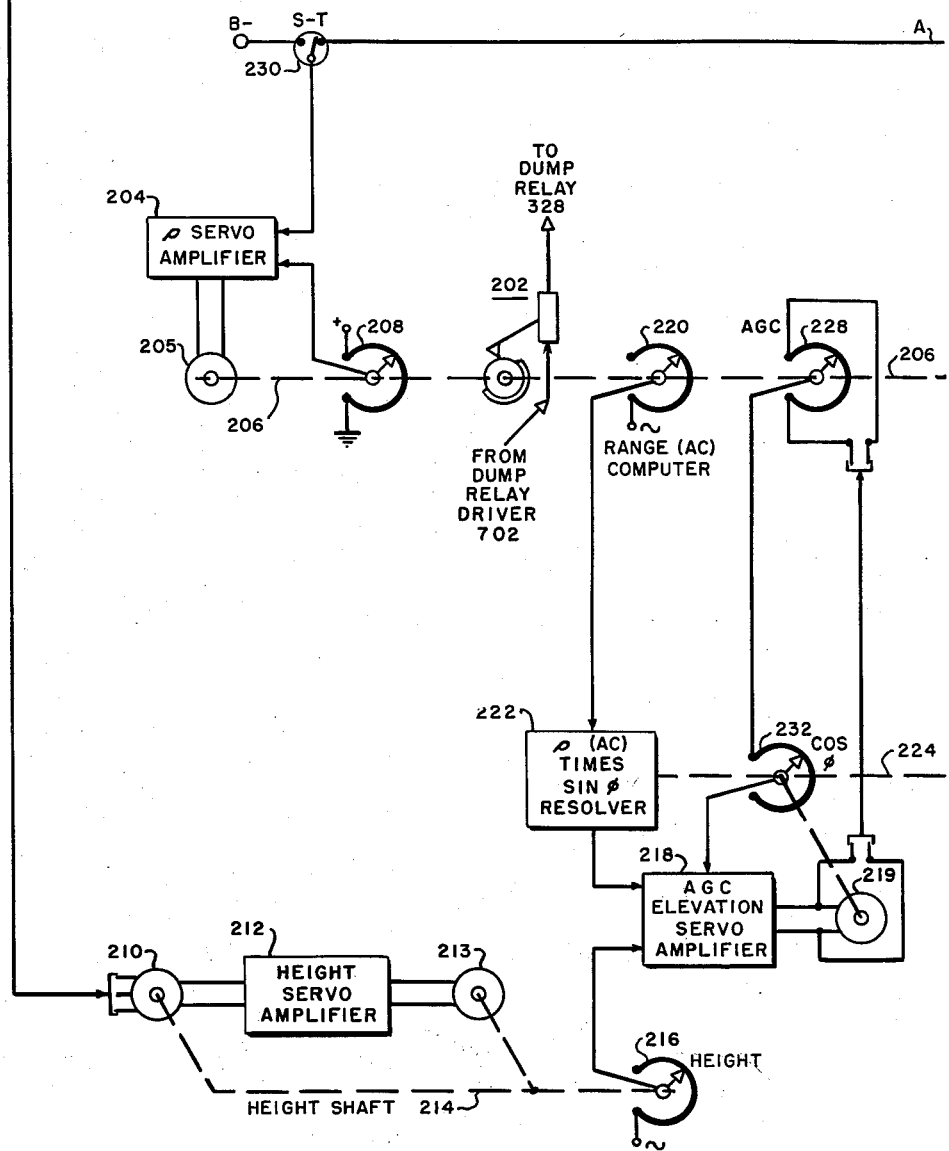
Figure 3:
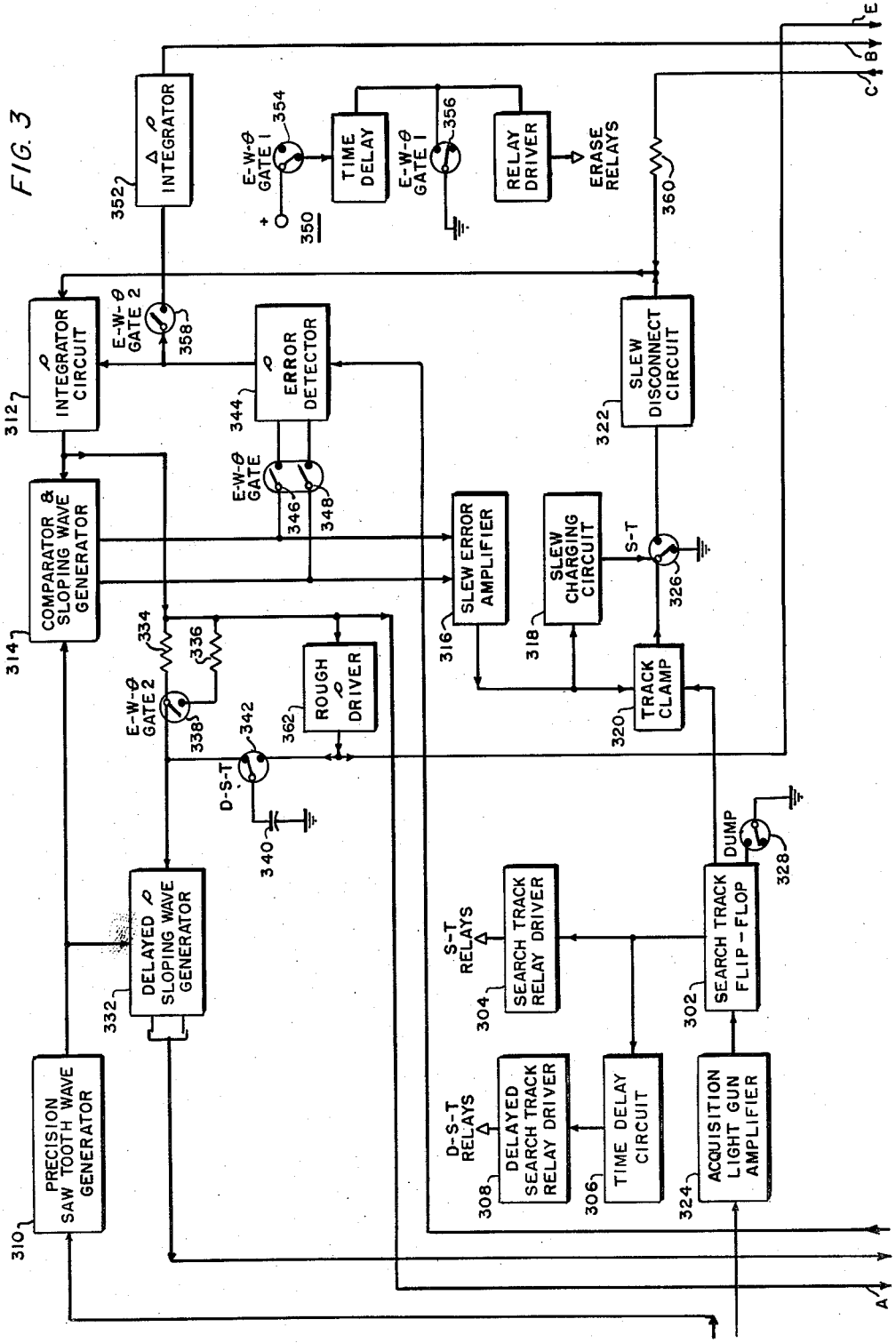
Figure 4:
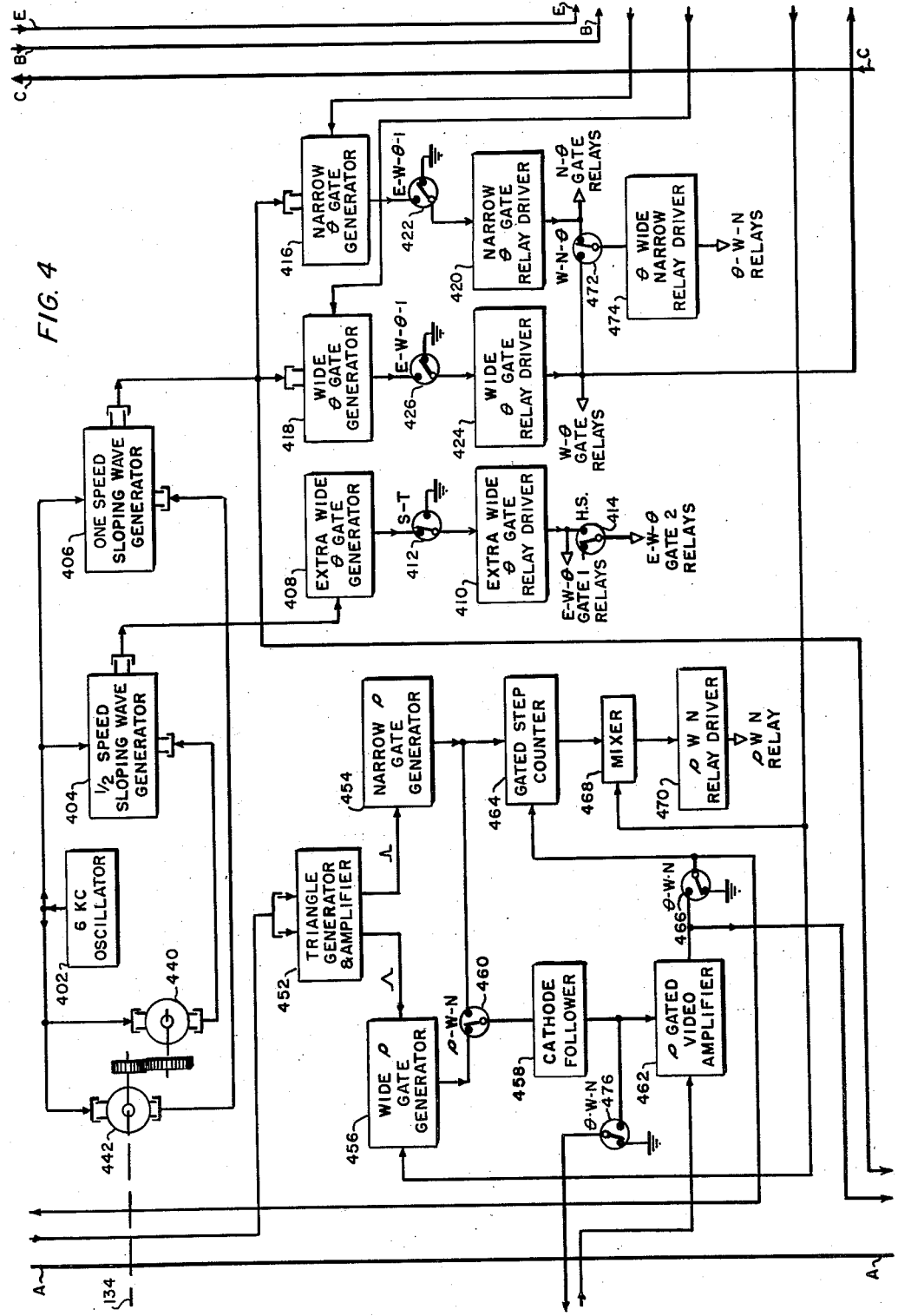
Figure 5:
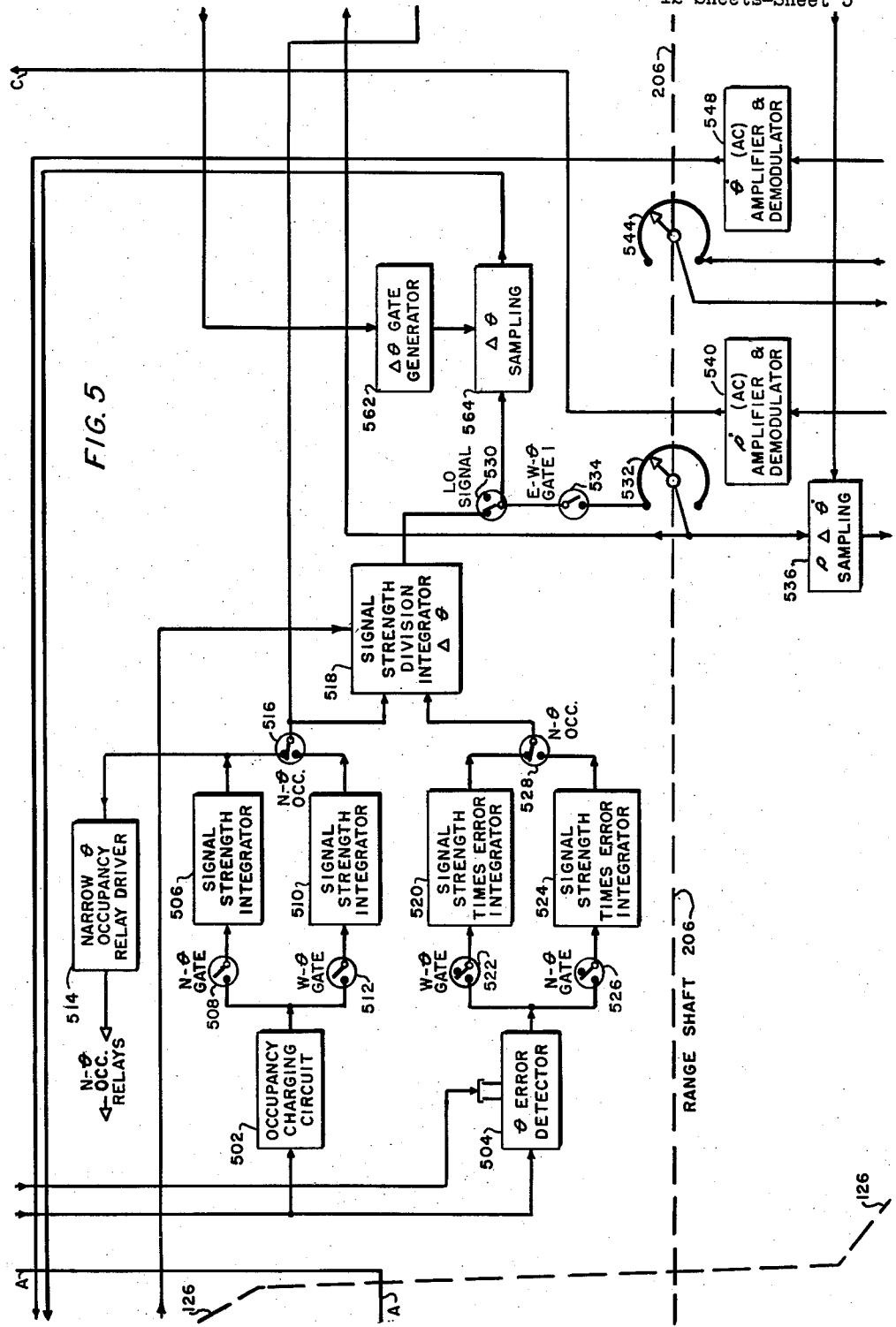
Figure 6:
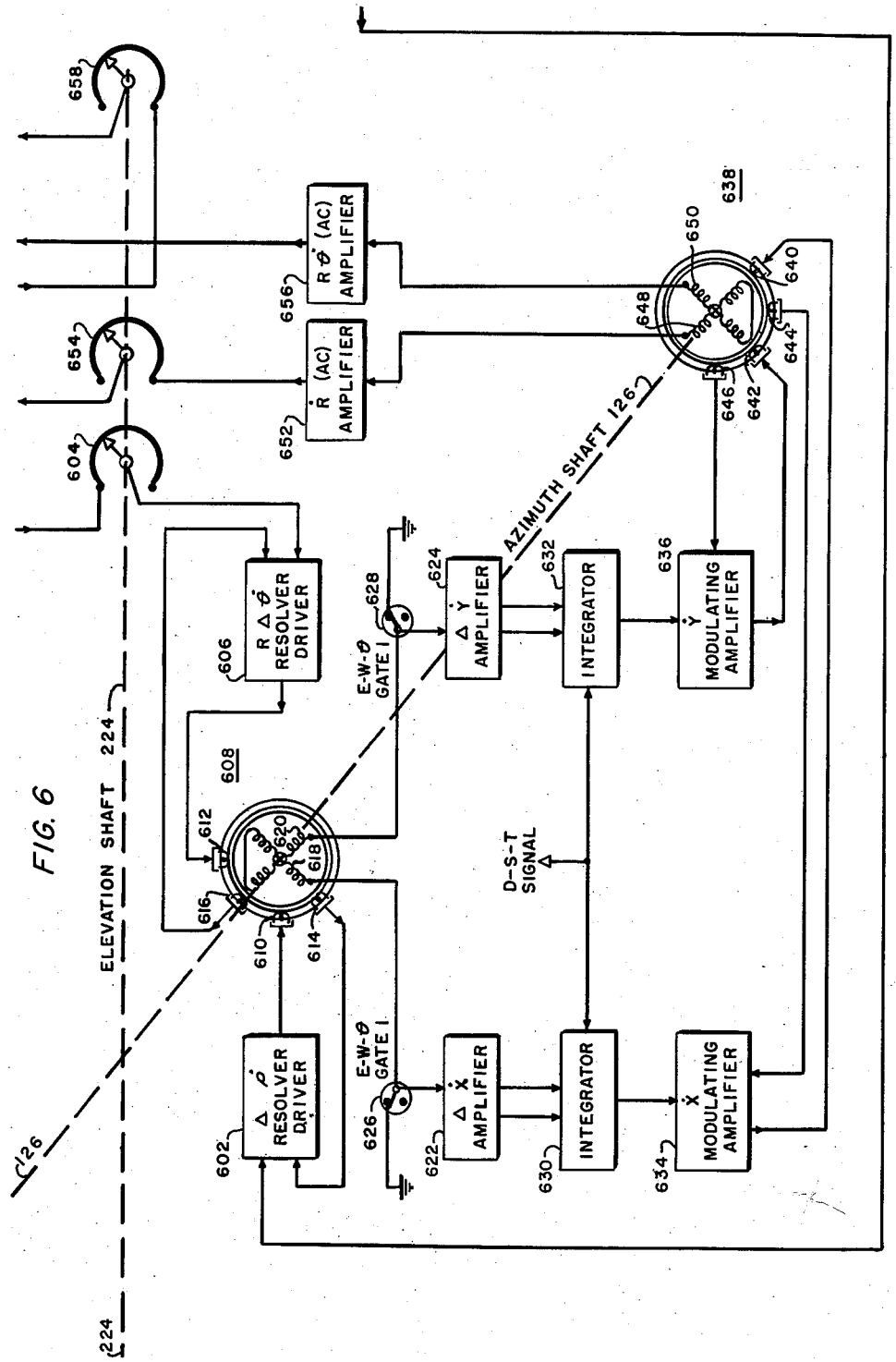
Figure 7:
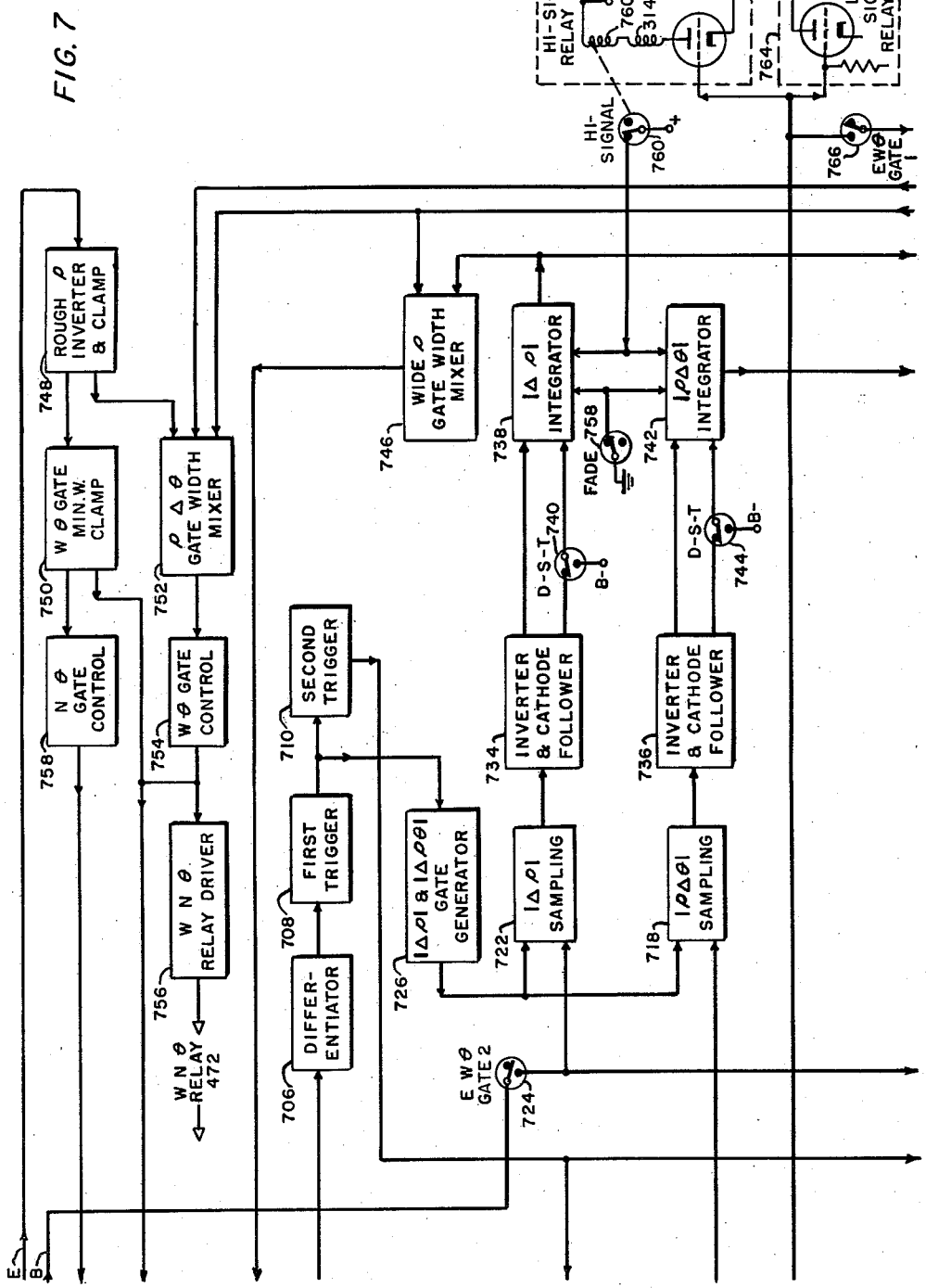
Figure 8A:
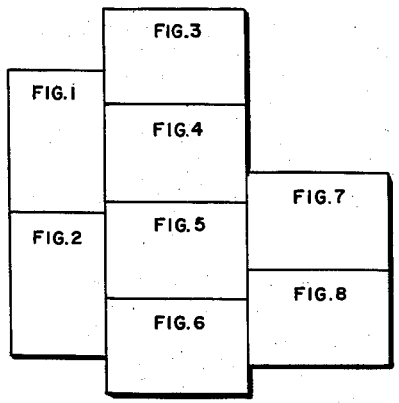
Figure 14:
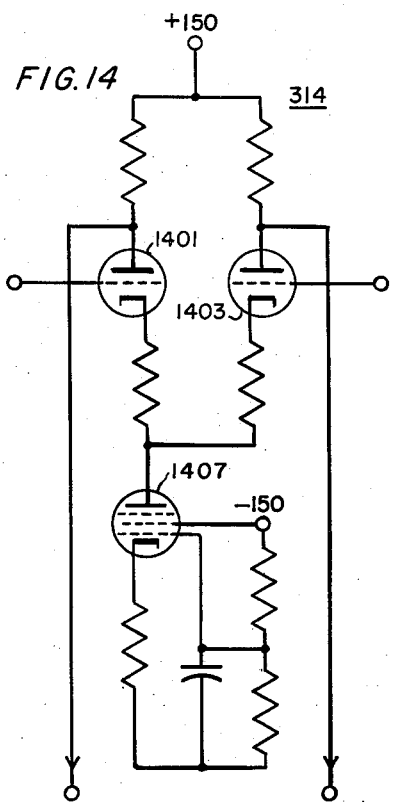
Figure 15:
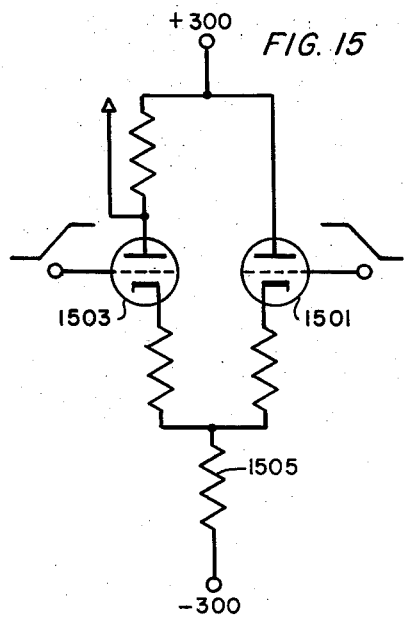
Figure 16:
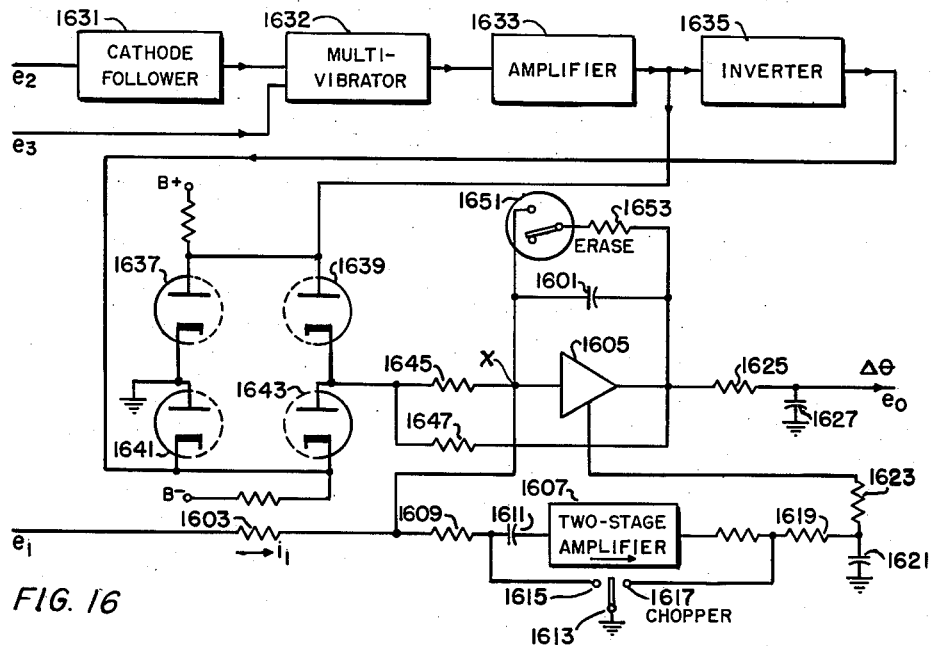
Figure 9:
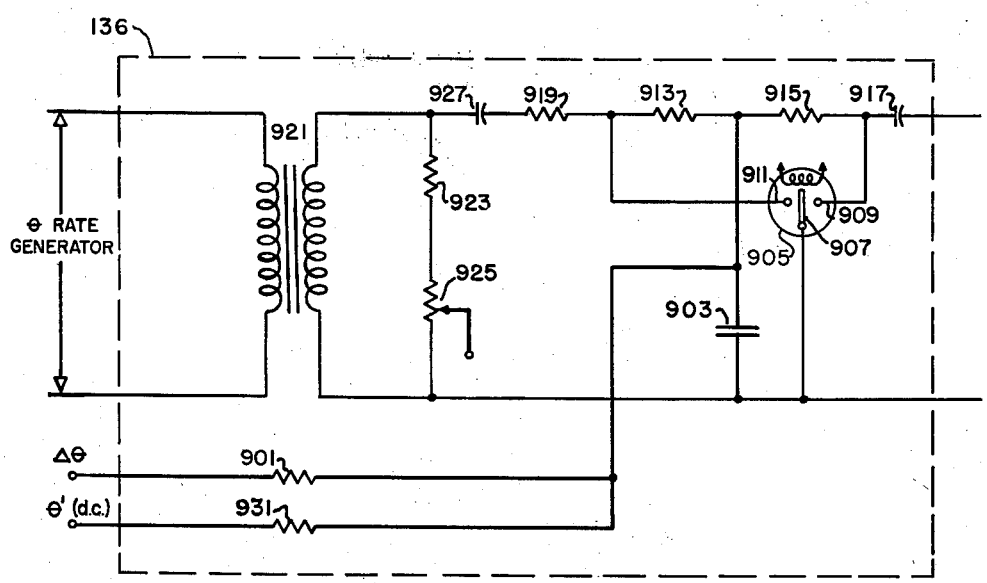
Figure 10:
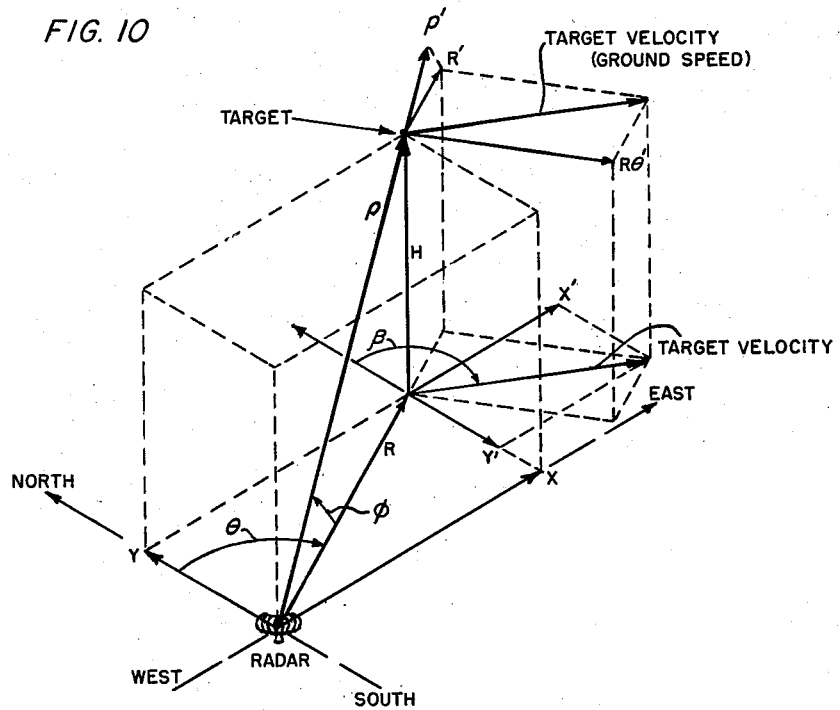
Figure 11:
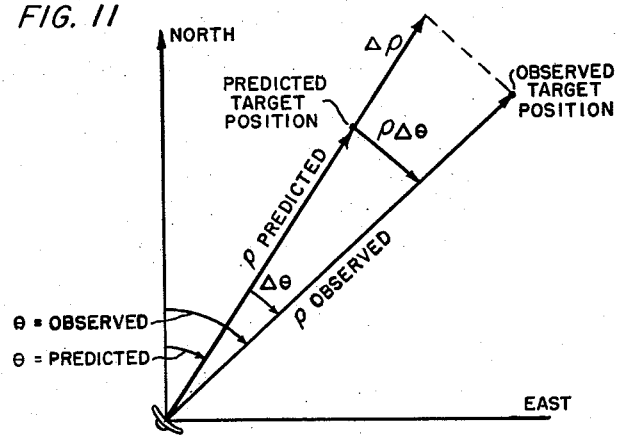
Figure 12:
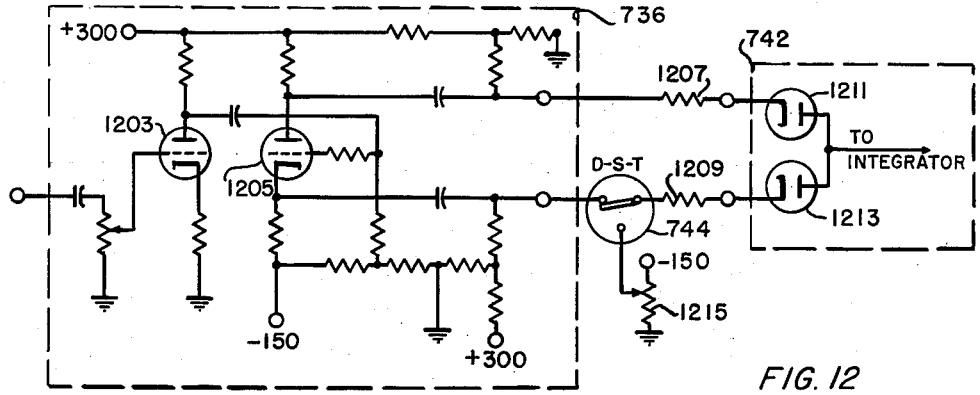
Figure 13:
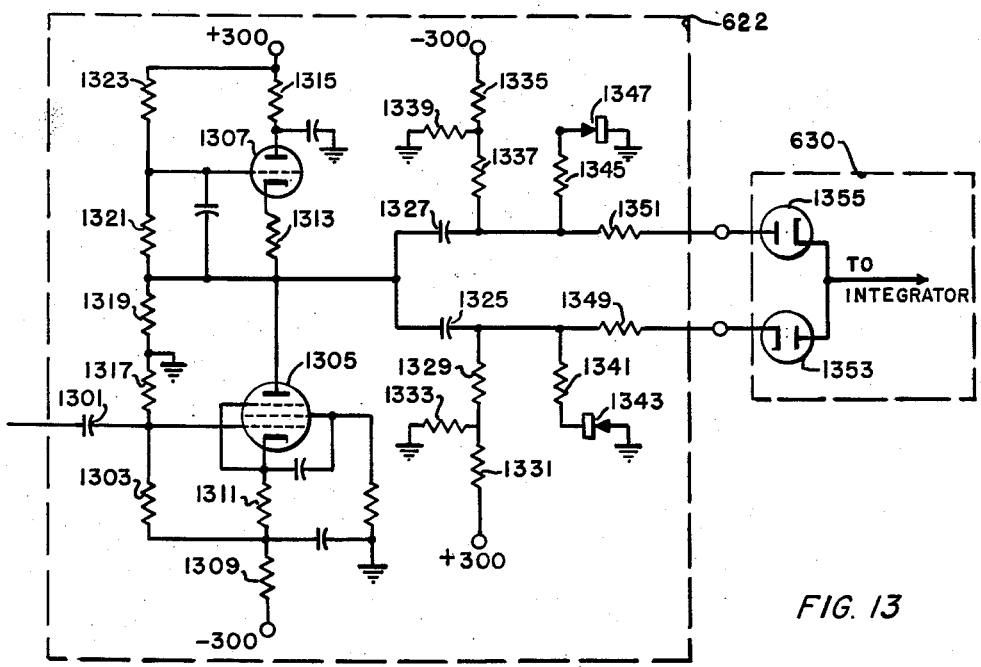

These and other objects, features, and advantages of this invention will become apparent from the following detailed description of the invention taken in connection with the accompanying drawings in which:

FIGURES 1 through 8 constitute a schematic diagram of a track-while-scan radar system according to the invention, the single figures of which may be assembled into a unitary drawing as shown in FIG. 8a, FIG. 9 is a detail schematic drawing of a portion of an azimuth integrator preamplifier circuit shown in block diagram form in FIG. 1, FIG. 10 is a three dimensional plot of the geometry of the tracking problem to which the present system is applicable and includes the symbols used throughout the description to designate the various quantities involved, FIG. 11 is a two dimensional plot of the geometry of certain quantities involved in the prediction of azimuth angles, and the symbols applied thereto, FIG. 12 is a detail schematic drawing of a portion of a phase splitter or inverter circuit and the input portion of a range error integrator circuit shown in block diagram form in FIG. 7, FIG. 13 is a detail schematic drawing of a velocity error amplifier and charging circuit and the input to an integrator circuit shown in block diagram form in FIG. 6, FIG. 14 is a detail schematic diagram of a basic portion of a comparator and sloping wave network shown in block diagram form in FIG. 3, FIG. 15 is a detail schematic diagram of a portion of a slew charging circuit shown in block diagram form in FIG. 3, and FIG. 16 is a detail schematic drawing of a signal strength division integrator circuit shown in block diagram form in FIG. 5.

The reference characters used to designate various elements in the system have been keyed to the figure of the drawing in which the elements are found. Elements bearing reference characters in the one hundred series will be found in FIG. 1, elements bearing reference characters in the two hundred series will be found in FIG. 2, and so on. The only exception to this scheme is where an element such as one of the various shafts extends through more than one figure of the drawing. In such cases the element bears the same reference character through all the figures and the series of the reference character is determined by the figure in which the element originates. This system makes it unnecessary to continually refer to a figure of the drawing to locate an element of the system.

In the drawings, FIGS. 1 through 8, 12 and 16, include a plurality of relays. These relays have been shown as full line circles enclosing the relay contacts in their de-energized positions. No relay coils are shown and each relay is legended with the name of the particular relay excitation signal which energizes that relay. The elements which furnish the relay excitation signals bear a corresponding designation. The interconnecting leads and the relay coils have been omitted to simplify the drawings.

Before describing the specific apparatus involved, the following table defines the symbols used to designate the various quantities throughout the description:

$\theta$ = azimuth angle relative to a reference direction
$\rho$ = slant range
$\phi$ = elevation angle relative to the horizontal
$R$ = ground range ($R = \rho \cos \phi$)
$H$ = height ($H = \rho \sin \phi$)
$X$ = east-west range ($X = R \sin \theta$)
$Y$ = north-south range ($Y = R \cos \theta$)
$\dot{\theta}$ = angular azimuth velocity
$\dot{\rho}$ = radial velocity
$\dot{R}$ = ground radial velocity
$R\dot{\theta}$ = tangential velocity
$\dot{X}$ = east-west ground velocity
$\dot{Y}$ = north-south ground velocity
$\Delta\rho$ = tracking error in slant range
$\Delta\theta$ = angular position error in azimuth
$R\Delta\theta$ = tangential tracking error
$R\Delta\dot{\theta}$ = tangential tracking error velocity
$\Delta\dot{\theta}$ = azimuth angle velocity error
$\Delta\dot{\rho}$ = slant range velocity error
$\Delta\dot{X}$ = velocity error (X direction)
$\Delta\dot{Y}$ = velocity error (Y direction)

The physical relation and meaning of the above terms may be more easily understood by reference to FIGS. 10 and 11 which illustrate the geometry of the radar tracking problem on which the system of the present invention operates. The various quantities represented in FIGS. 10 and 11 bear the designations set out in the table of definitions.

The entire system becomes quite involved and complex. The system embodying the invention will be accordingly described, first in its search mode of operation; second its operation in the acquisition of a selected target; third in its track mode of operation during the acquisition scan; fourth in its track mode of operation after the acquisition scan, neglecting the special provisions which come into play only if the target is lost from the gates or is subject to excessive interference; and fifth in its tracking mode of operation when these special provisions are utilized.

Search Mode of Operation

Referring now to FIGS. 1 through 8, there is shown a search radar system which consists of an azimuth search radar transmitter and receiver 102, to which trigger pulses are applied from a radar trigger pulse generator 104, and which transmits exploratory pulses and receives echo pulses of surrounding targets from an azimuth search radar antenna 106. Azimuth search radar antenna 106 rotates in the azimuth at a constant rate. A plan-position-indicator 108 presents a polar coordinate display of the range and azimuth of surrounding targets from received echo pulses applied thereto from the azimuth search radar transmitter and receiver 102, and azimuth data applied thereto from the azimuth search radar antenna 106 through an azimuth scan antenna data transmitter synchro 110. The search radar system used with the track-while-scan channel actually constructed, was of the type designated as AN/CPS–5 search radar whose antenna rotated at 12 r.p.m.

Azimuth data obtained from the azimuth scan antenna data transmitter synchro 110 is also applied to an azimuth scan antenna data receiver synchro 112 and to a θ follow-up synchro 114 of the track-while-scan channel.

The output of the azimuth scan antenna data receiver synchro 112 is applied to an azimuth scan antenna servo amplifier 116 and a servo motor 117 to rotate an antenna output shaft 118. The antenna output shaft 118 is coupled in a follow-back connection to the rotor of the azimuth scan antenna data receiver synchro 112, whereby the output antenna shaft 118 rotates in synchronism with the azimuth search radar antenna 106.

The output of the θ follow-up synchro 114 is applied as one input to a θ follow-up preamplifier 120. The output of the θ follow-up preamplifier 120 is applied as an input to a θ servo amplifier and motor 122 through a search-track relay 124 (denoted as S-T relay on the drawing). The manner in which the relay is energized will be explained below.

An azimuth shaft 16 is driven by the output of the θ servo motor 123 and in turn drives the rotors of the θ follow-up synchro 114 and a θ rate generator 128. The output of the θ rate generator 128 is applied as a second input to the θ follow-up preamplifier 120 through a search-track relay 130 when it is energized and in its search position. The output from the θ rate generator 128 is 180° out of phase with the output signal from the θ follow-up synchro 114. It will be apparent therefore, that when the search-track relays 124 and 130 are in their search position, azimuth shaft 126 will rotate in synchronism with the azimuth search radar antenna 106, the θ rate generator 128 providing velocity damping of the system.

The output antenna shaft 118 and the azimuth shaft 126 are coupled respectively to first and second inputs of a mechanical differenial 132, which also has a differential output shaft 134. Since, in the search mode of operation of the track-while-scan channel, both the output antenna shaft 118 and the azimuth shaft 126 are rotating at the same rate, i.e., the rate of rotation of the azimuth search radar antenna 106, the differential output shaft 134 does not turn. The differential output shaft 134 is used to derive gating voltages for the tracking operation of the system in a manner which will be fully described hereinafter.

A search-track flip-flop circuit 302 is provided which may be a multivibrator circuit normally stable in one condition which is termed its "search" condition. The output voltage of the search-track flip-flop circuit 302 is applied directly to a search-track relay driver 304 and through a time delay circuit 306 to a delayed search-track relay driver 308. The relay drivers may be conventional switching tube circuits and the output voltage from the search-track flip-flop circuit 302 is such that it renders the search-track relay driver 304 and the delayed search-track relay driver 308 conducting when it is in its search condition, and it drives them to cut-off or renders them non-conducting when it is in its track condition. The output of the search-track relay driver 304 is used to energize all the search-track relays (designated S-T relays in the drawing), and the output of the delayed search-track relay driver 308 is used to energize all the delayed search-track relays (designated D-S-T relays in the drawing). It will be apparent therefore, that during the search operation now being described, that all of the S-T relays and the D-S-T relays are energized. The output voltage of the search-track flip-flop circuit 302 also is applied as a control voltage to a track clamp circuit 320. This voltage maintains the track clamp circuit at cut-off when the search-track flip-flop circuit is in its search condition. The purpose and function of the track clamp circuit 320 will be apparent later.

A precision sawtooth generator 310 is synchronized by trigger pulses applied thereto from the radar trigger pulse generator 104 and generates a linear sawtooth wave occurring at the trigger pulse repetition frequency. The voltage rise of the precision sawtooth wave is substantially linear and its voltage magnitude is thus proportional to the time elapsed after the system trigger. The output voltage of the precision sawtooth generator 310 is applied as one input to a comparator and sloping wave generator 214. A second input to the comparator and sloping wave generator 214 is obtained from a range or ρ integrator circuit 212. The circuit of the comparator and sloping wave generator 214 is shown in the copending application of Warren D. White, Serial No. 421,210, filed April 5, 1954, now U.S. Patent 3,040,257, for Means for Generating a Symmetrical Gate Voltage. A similar circuit is also shown by the U.S. Patent 2,561,475, issued to A. B. Jacobsen on July 24, 1951. Its function may be generally described as producing a pair of voltage outputs, one having an increasing slope and the other a decreasing slope with respect to time. The slope of the increasing and decreasing functions are numerically equal but in opposite directions. The crossover point of the sloping wave outputs, i.e., the point where they are equal in magnitude, occurs at a time when the magnitude of the two voltage inputs to the comparator are equal.

During the search mode of operation of the track-while-scan channel it is desired to cause the output voltage of the range integrator circuit 312 to correspond at all times to the actual range then being investigated by the scanning search radar. As has been previously pointed out, the voltage produced by the sawtooth generator 310 varies linearly with respect to time following the initiating system trigger from the radar trigger pulse generator 104. This voltage then initiated at the moment of transmission of a radar pulse is linearly proportional to the range being investigated by the transmitted pulse. The output of the range integrator is therefore slewed or made to follow the sawtooth output from the sawtooth generator 310.

This is accomplished by a feedback loop system which will now be described. The feedback loop consists of the ρ integrator circuit 312, the comparator and sloping wave generator 314, a slew error amplifier 316, a slew charging circuit 318 which is shunted by a track clamp circuit 320, and a slew disconnect circuit 322.

The basic circuitry of the comparator and sloping wave network circuit 314 is partially illustrated in FIG. 14. It consists of a pair of electron discharge tubes 1401 and 1403. The circuits including the anode and cathode resistors of the two tubes are connected in parallel and in series with the circuit of a third tube 1407 across the source of supply. The sawtooth voltage from the sawtooth generator 310 is applied to the grid of tube 1403 while the output from the ρ integrator circuit 312 is applied to the grid of tube 1401. As the sawtooth wave increases in magnitude at some point the tube 1403 begins to conduct heavily and its plate voltage falls off correspondingly as the conductivity increases. This dropping voltage is the negative sloped wave output. As tube 1403 becomes increasingly conductive the potential of the anode of tube 1407 tends to rise and thus decrease the conductivity of tube 1401. The anode voltage of tube 1401 thus exhibits the initially low voltage rising with time of the positively sloping wave.

The time of the voltage rise of the anode of tube 1401 is, however, variable with respect to the voltage drop on the anode of tube 1403 by an amount dependent upon the potential existing on the grid of tube 1401. This potential is that obtained from the output of the range integrator 312 and it operates to shift the crossover point where the sloping waves are equal in magnitude.

The two sloping wave output voltages from the comparator circuit 314 is applied through the slew error amplifier 316 to the slew charging circuit 318. The basic slew charging circuit is shown in FIG. 15. It consists of a pair of electron tubes 1501 and 1503 having anode-cathode circuits connected across the source through a common cathode resistor 1505. The positive sloping wave from the comparator and generator 314, inverted in amplifier 316, is applied to the grid of tube 1501 while the inverted negative sloping wave is applied to the grid of tube 1503. The inverted positive going wave applied to the grid of tube 1501 causes it to conduct heavily at first and so bias tube 1503 toward a non-conducting condition. The inverted negative sloping wave applied to the grid 1503 tends to increase this effect. The output voltage taken from the anode of tube 1503 is thus high at first. As time goes on however, the voltage on the grid of tube 1501 decreases and the voltage on the grid of tube 1503 increases. This tends to reverse the conductive states of the tubes and lower the output voltage. The time when this effect occurs is determined by the amount the positive sloping output wave of the comparator has been shifted by the range integrator voltage.

If the range integrator output voltage, which is positive, is small the shift is relatively large and consequently the output voltage of the slew charging circuit 318 will be high for a longer period of time. This high input to the range integrator circuit 312 causes it to increase its output voltage until it corresponds to that of the sawtooth wave. Similarly a large integrator output voltage, with a corresponding small sloping wave shift, will cause an output shift in the opposite direction to decrease the input to the range integrator circuit.

The above described action takes place very swiftly and as a result the output voltage of the range integrator follows the magnitude of the sawtooth wave very closely. The range integrator circuit, therefore, during the search mode of operation, sweeps in range from zero to a maximum with the same speed as the range of the search radar shifts during the same interval.

The slew disconnect circuit 322 consists of a gaseous discharge tube such as a neon tube type NE–54 which continues to conduct the output from the slew charging circuit 318 to the $\rho$ integrator 312 only so long as no other input signal is applied to the input of the $\rho$ integrator. When any other input signal is applied the neon tube ceases to conduct and so disconnects the slew charging circuit from the integrator.

The track clamp circuit 320 which shunts the slew charging circuit consists of clamp tubes which are maintained in a cut-off condition during the search mode of operation. Upon switching to the track mode of operation which will be described later, the clamp tubes are rendered conductive and a search track relay 326 grounds the output of the slew charging circuit to break the feedback loop and disable the slewing operation just described.

From the above it will be apparent that when the track-while-scan channel is in its search mode of operation the azimuth shaft 126 rotates at the same rate as the electron beam of plan-position-indicator 108, i.e., in synchronism with the azimuth search radar antenna 106, and the output voltage of the $\rho$ integrator 312 sweeps from zero to a maximum in sychronism with the range sweep of the electron beam of plan-position-indicator 108, therefore, the track-while-scan channel searches the entire area displayed on the plan-position-indicator 108. In other words, the position of the azimuth shaft 106 and the range integrator output voltage are always representative of the particular location being investigated by the search radar at any instant.

Acquisition of a Selected Target

The operation of the system while tracking a selected target will now be described.

A selected target is acquired by placing an acquisition video light gun 138 over the display of the particular target on the plan-position-indicator 108. The light gun 138, which includes a photocell, is normally inoperative but is rendered operative by pressing a manual button (not shown) thereon. This button is pressed immediately prior to the sweep of the electron beam of plan-position-indicator 108 through the selected target indication. The sudden increase in fluorescence of the display of this selected target as the electron beam of plan-position-indicator 108 scans therethrough produces an acquisition video pulse from the light gun 138 which is then amplified in an acquisition light gun amplifier 324. The amplified video pulse is applied from the light gun 138 and the amplifier 324 to the search-track flip-flop 302 in such a manner as to cause the search-track flip-flop 302 to switch from its normal "search" condition to its "track" condition.

The switch of the search-track flip-flop 302 from its search condition to its track condition results in the cut-off signal applied from the search-track flip-flop 302 to the track clamp circuit 320 being removed, whereupon the input voltage is shunted around the slew charging circuit 318. The search-track relay 326 is deenergized and the input to the slew charging circuit 318 and the output therefrom are effectively shorted out or grounded through the relay contacts. This breaks the previously described feedback loop between the output and the input of the $\rho$ integrator circuit 312. Opening the search electronic feedback loop stops the output of the $\rho$ integrator circuit 312 at a voltage having a magnitude which is that of the moment of acquisition of the selected target, and which is hence, representative of the range to that particular target.

The search-track relay driver 304 is cut-off by the signal applied thereto from the search-track flip-flop 302 when the search-track flip-flop 302 is switched into its track condition. This results in the search-track relay excitation signal output of the search-track relay driver 304 being removed from all the search-track relays in the track-while-scan channel; whereupon the search-track relays are deenergized and switch to their track positions.

Although the same signal which is applied from the search-track flip-flop 302 to the search-track relay driver 304 is also applied to the delayed search-track relay driver 308 through the time delay circuit 306, the delayed search-track relay driver 308 is not cut-off during the acquisition scan because the time delay provided by the time delay circuit 306 is of the order of several seconds. However, the time delay provided by the time delay circuit 306 is less than the period of rotation of the azimuth search radar antenna 106, so that the delayed search-track relay driver 308 will be cut-off on the next scan of the azimuth search radar antenna 106 after the acquisition scan and the delayed search track relays are deenergized at this time.

Since the search-track flip-flop 302 is normally stable in its search condition, means must be provided for holding it in its track condition after it is once switched thereto by an acquisition video pulse from the selected target. This is accomplished by grounding a point in the search-track flip-flop circuit 302 through a dump relay 328. The dump relay 328 is energized and closes in response to the search-track flip-flop 302 being switched to its track condition. The search-track flip-flop 302 therefore becomes stable in its track condition by causing the closing of a holding circuit.

Reference is now made to FIGS. 2, 3 and 8 to explain the energization of the dump relay 328. Automatic dump relay driver 802 is normally energized from an occupancy triggered integrator or fade-voltage circuit 838 (to be described later), and supplies a dump relay excitation signal at all times when a trackable target exists. This dump relay excitation signal passes through a search-track relay 804, when in its track position, to a cam operated dump micro switch 202 (operated by the $\rho$ servo output shaft 204) to energize the dump relay 328. It will therefore be seen that the switching of the search-track relay 804 from its search to its track position, in response to the search-track flip-flop 302 being switched to its track condition by the video pulse from the selected target, causes the dump relay 328 to be energized.

In addition to being applied to the comparator and sloping wave generator 314, the output of ρ integrator 312 is also applied over a lead A to a first input of a ρ servo-amplifier 204 and a motor 205 through a search-track relay 230, when it is in its track position. When the search-track relay 230 is in its search position a fixed D.C. potential (B−) is applied to the first input of ρ servo-amplifier 204. This fixed potential corresponds to a mid-range setting, for example, 50,000 yards and causes the servo motor 205 to drive the range shaft 206 to assume that position. Range shaft 206, which is turned by motor 205, is coupled to a ρ (D.C.) computer potentiometer 208. The ρ (D.C.) computer potentiometer is energized by a fixed D.C. voltage equal to the potential difference between the minimum and maximum magnitudes of precision sawtooth generator 310. The output of the ρ (D.C.) computer potentiometer 208 is applied as a second input to the ρ servo-amplifier 204. The circuit, as just described, constitutes a null servo system and will result in range shaft 206 moving to an equilibrium position determined by the magnitude of the first input applied to the ρ servo-amplifier 204. The magnitude of the fixed potential applied to the first input of the ρ servo-amplifier 204, when the search-track relay 230 is in its search position, is such that the null position of the range shaft 206 will indicate mid-range. When the search-track relay 230 is switched to its track position, upon the acquisition of a selected target, range shaft 206 will slew to the range of the selected target as indicated by the output voltage from the ρ integrator 312 at that time.

The acquisition of the selected target causes the search-track relays 124 and 130 to be deenergized and to switch from their search position to their track position. This results in disconnecting the output of the θ follow-up preamplifier 120 from the input of the θ servo-amplifier 122 and connecting the output of a θ integrator preamplifier 136 thereto. Also, the output of the θ rate generator 128 is disconnected from the second input to θ follow-up preamplifier 120 and is connected to a first input of the θ integrator preamplifier 136. In addition, a search-track relay (not shown) which grounds all the input circuits of the θ integrator preamplifier 136 when the track-while-scan channel is in its search mode of operation, is opened when the track-while-scan channel is in its search mode of operation, is opened when the track-while-scan channel is in its track mode of operation.

The disconnecting of the output of the θ follow-up preamplifier 120 from the input to the θ servo-amplifier 122, upon acquisition of the selected target, causes azimuth shaft 126 to stop rotating at the instant the selected target is acquired. The position of azimuth shaft 126 at this instant represents a predicted azimuth angle. Antenna shaft 118 however, continues to rotate in synchronism with azimuth search radar antenna 106. Since one of the inputs to the mechanical differential 132, the azimuth shaft 126, is now standing still and the other of the inputs to mechanical differential 132, the antenna shaft 118, continues to rotate in synchronism with the azimuth search radar antenna 106, the differential output shaft 134 will start rotating at the same rate as antenna shaft 118.

*Track Mode of Operation During the Acquisition Scan*

Additional echo pulses from the selected target are received in the azimuth search radar transmitter and receiver 102 during the acquisition scan after the initial acquisition video pulse is generated. These echo pulses are used to correct errors in the predicted range and azimuth of the selected target, as represented by the position of the range shaft 206 and the azimuth shaft 126 respectively. In order to accomplish this, range and azimuth gates symmetrically disposed about the predicted range and azimuth must be generated, and the range and azimuth errors occurring within these gates must be measured.

The apparatus for the generation of the azimuth gates will be considered first. The differential output shaft 134 is coupled to the rotors of a control transformer 440 and a control transformer 442. The control transformers may be of the synchro type, each being connected so as to effectively have one stator and one rotor winding. The rotor of control transformer 440 is geared to the differential output shaft 134 so that it turns at one-half the speed of the differential output shaft, while the rotor of the control transformer 442 is coupled directly to the differential output shaft so that it rotates at the same speed as the output shaft. The output voltage of a 6 kilocycle per second oscillator 402 is applied to the stator of both control transformers. A sine wave amplitude-modulated 6 kilocycle output signal will be induced in each of the rotors of the control transformers 440 and 442. The frequency of the sine wave modulation of the output signal induced in control transformer 440 will be one-half that of the angular speed of rotation of the differential output shaft 134, and the frequency of the sine wave modulation of the output signal induced in control transformer 442 will be the same frequency as that of the angular speed of rotation of the differential output shaft 134. The same effect could be obtained if the 6 kilocycle oscillator voltage were applied to the rotor of the control transformers and the output signals taken from the stators thereof.

It will be apparent that there are two nulls in the output signal of each control transformer for each revolution of the rotor thereof. The one-half speed control transformer 440 acts as an anti-ambiguity element to distinguish the true shaft null position in accordance with well known servo mechanism principles. It will be remembered that during the search operation of the system both input shafts to the differential 132 were controlled through follow-up systems whose inputs were taken from the azimuth position of the azimuth search radar antenna 106. The rotation of the two input shafts acting through the differential sets the initial position of the differential output shaft 134. In this initial position the rotors of both control transformers 440 and 442 are located in null positions and remain in this position until the output shaft is caused to rotate following the acquisition pulse generated by the light gun 138. Therefore, the coincidence of nulls in both control transformer rotors is indicative of the instantaneous azimuth of the search radar antenna 106 at the moment of acquisition of the target. The output signals from the one-half speed control transformer 440 are applied to a one-half speed sloping wave generator 404. The output signal from the rotor winding of the one speed control transformer 442 is applied to the one speed sloping wave generator 406. In addition, the 6 kilocycle voltage from the oscillator 402 is applied to both one-half speed sloping generator 404 and one speed sloping generator 406. Each of the sloping wave generators 404 and 406 includes a phase sensitive detector wherein the applied signal voltage is compared with the oscillator output as a reference voltage to obtain a measure of the modulation components of the signals applied thereto from the respective control transformers. The output of the phase sensitive detector is a D.C. voltage which is used to control the output of a sloping wave generator which again is the same as that specifically disclosed in the above-identified application of Warren D. White, mentioned in connection with the comparator generator element 314. The function of each sloping wave generator is to produce substantially linear sloping waves having crossover points in time coincidence with the nulls of the modulated signal applied as an input to that generator.

The sloping wave output from the one-half speed sloping wave generator 404 is applied to an extra wide θ gate generator 408 (designated E.W. θ Gate GEN. in the drawing). The extra wide θ gate generator 408 is a differential amplifier which produces a signal pulse symmetrically disposed about the crossover point of the sloping wave inputs applied thereto, whose position in time is in turn determined by the position of the azimuth shaft 126 at the instant the drive was removed therefrom by the acquisition pulse. The width of the extra wide θ gate which is determined by the manually set biasing of the differential amplifiers of the extra wide θ gate generator 408, represents approximately 30°. Reference is again made to the above-identified application of Warren D. White for a specific disclosure of the gate circuitry. An extra wide θ gate relay driver 410, which is normally cut-off is rendered operative in response to the extra wide θ gate voltage being applied thereto from the extra wide θ gate generator 408 through a search-track relay 412 when this relay is in its track position. Extra wide θ gate relay driver 410 provides an excitation signal which is applied directly to a plurality of relays in the track-while-scan channel legended "E.W. θ Gate 1" to effect energization thereof. This excitation signal is also applied through a high signal (H.S.) relay 414 to a plurality of relays in the track-while-scan channel legended "E.W. θ Gate 2." The high signal relay 414 is normally closed when the track-while-scan channel is in its track mode of operation and is opened only under special circumstances to be explained later. The presence of the search track relay 412 between the extra wide θ gate generator 408 and the extra wide θ gate relay driver 410 insures that there will be no excitation of the extra wide θ gate relays when the track-while-scan channel is in its search mode of operation.

The output signals from the one speed sloping wave generator 406 are applied as inputs to both a narrow θ gate generator 416 and a wide θ gate generator 418. Both the narrow θ gate generator 416 and the wide θ gate generator 418 are differential amplifiers of the same type as the extra wide θ gate generator 408. However, narrow θ gate generator 416 is variably biased to produce a gate having a width of from 2° to 5°, and the wide θ gate generator 418 is variably biased to produce a gate having a width of from 4° to 20°. The actual width of the wide and narrow θ gates at any given time is determined by the magnitude of first and second bias control signals applied to the wide and narrow θ gate generators 416 and 418 respectively. These bias control signals will be discussed in detail later. The output of the narrow θ gate generator 416 is applied to the narrow θ gate relay driver 420 through an extra wide θ gate 1 relay 422, and the output of the wide θ gate generator 418 is applied to a wide θ gate relay driver 424 through an extra wide θ gate 1 relay 426. The narrow θ gate relay driver 420 and the wide θ gate relay driver 424 are normally cut-off and are rendered conducting only during the application of inputs from the narrow θ gate generator 416 and the wide θ gate generator 418, respectively. The output from the θ gate relay driver 420 is used to energize all the narrow θ gate relays (designated N. θ Gate Relays in the drawing), and the output from wide θ gate relay driver 424 is used to energize all the wide θ gate relays (designated W. θ Gate Relays in the drawing). In addition, these outputs have other uses which will be discussed later.

Since the output of the one speed sloping wave generator 406 has two crossover or null points for each cycle of the azimuth search radar antenna 106, one occurring when the azimuth search radar antenna 106 has an instantaneous azimuth the same as that indicated by the azimuth shaft 126, and the other occurring when the azimuth search radar antenna 106 has an instantaneous azimuth 180° out of phase with the azimuth indicated by azimuth shaft 126, it is necessary to remove the effect of the second crossover point. The extra wide θ gate 1 relays 422 and 426 inserted respectively between their associated gate generators and relay drivers accomplish this removal.

Considering now the generation of the range gates, the output of the ρ integrator 312 is applied as a control voltage to a delayed ρ sloping wave generator 332 directly through a resistor 334. The resistor 334 may be shunted by a resistor 336 and an extra wide θ gate 2 relay 338. These resistors together with a capacitor 340 form delay networks when a delayed search track relay 342 is in its track position, the time constant of the network depending upon the effective resistance switched into the circuit at a particular time. However, since the delayed search track relays remain in their search position throughout the acquisition scan the function of the time delay networks will be considered later. The output of the precision sawtooth generator 310 is also applied to the delayed ρ sloping wave generator 332. The delayed ρ sloping wave generator 332 is similar to the sloping wave generator in the comparator and sloping wave generator circuit 314, and produces two linear sloping waves having equal but opposite slopes which have a crossover point determined by the magnitude of the control signal applied thereto from the ρ integrator 312.

The two sloping wave outputs of the delayed ρ sloping wave generator 332 are applied to a triangle generator and amplifier 452. The triangle generator and amplifier 452 produces two triangular pulse outputs, the apex of the triangles being in time coincidence with the crossover point of the sloping wave inputs applied thereto. One of these outputs is applied as an input to a narrow ρ gate generator and amplifier 454, and the other of these outputs is applied as an input to a wide ρ gate generator 456. The only difference between the two outputs of the triangle generator and amplifier 452 is in the slopes of the sides of the two triangular pulses. The steeper wave, which is that applied to the narrow ρ gate generator and amplifier 454, may be obtained from the more gradually sloping wave by biased amplifier techniques for example. Reference is again made to the copending application of Warren D. White as disclosing the specific gate circuitry.

The narrow ρ gate generator and amplifier 454 provides a gate having a width which may be preset from 2.5 to 5.0 microseconds by manually varying the biasing of the circuit. The biasing of the wide ρ gate generator 456 is automatically varied in accordance with the magnitude of a range width control signal, applied thereto from a wide ρ gate width mixer circuit 746, to vary the width of the wide gate between 2.5 and 25 microseconds. The manner in which the range width control signal is obtained and used will be discussed later.

Initially the wide gate from the wide ρ gate generator 456 is applied as an input to a wide-narrow ρ gate cathode follower 458, through a ρ wide or narrow relay 460, which is normally in its wide position. The manner by which the ρ wide or narrow relay 460 is switched to its narrow position will be discussed later. The output from the wide-narrow ρ gate cathode follower 458 is applied as a gate to a ρ gated video amplifier 462. Received echo pulses from the azimuth search radar transmitter and receiver 102 are also applied to the ρ gated video amplifier 462. The output from the ρ gated video amplifier 462 consists of those echo pulses which are received during the presence of the range gate.

The range gated echo pulse output from the ρ gated video amplifier 462 is applied to an occupancy charging circuit 502 and a θ error detector 504. The occupancy charging circuit 502 consists of a current amplifier and the output therefrom is made up from current pulses having magnitudes respectively proportional to the individual amplitudes of the echo pulses applied thereto. The output from the occupancy charging circuit 502 is applied to both a narrow θ gate signal strength integrator 506 through a narrow θ gate relay 508, and a wide θ gate signal strength integrator 510 through a wide θ gate relay 512. The narrow θ gate relay 508 is closed only for the time interval of the narrow θ gate, and the wide θ gate relay 512 is closed only for the time interval of the wide $\theta$ gate.

The output from the narrow $\theta$ gate signal strength integrator 506 is proportional to the sum of the output current pulses of the occupancy charging circuit 502 which occur during the time interval the narrow $\theta$ gate relay 508 is closed, and the output from the wide $\theta$ gate signal strength integrator 510 is proportional to the sum of the output current pulses of the occupancy charging circuit 502 which occur during the time interval the wide $\theta$ gate relay 512 is closed.

A narrow $\theta$ occupancy relay driver 514, which is normally cut-off, is rendered conducting in response to the output of the narrow $\theta$ signal strength integrator 506, which is applied thereto, having a magnitude higher than a certain minimum value. The output of the narrow $\theta$ occupancy relay driver 514 energizes the narrow $\theta$ occupancy relays 516 and 528 (designated N. $\theta$ Occ. in the drawing) to switch them from their normal wide $\theta$ occupancy position to their narrow $\theta$ occupancy position. Either the output of the narrow $\theta$ gate signal strength integrator 506 or the output of the wide $\theta$ gate signal strength integrator 510 is selectively applied through a narrow $\theta$ occupancy relay 516 as a first input to a signal strength division integrator 518. Thus, the output of the wide $\theta$ signal strength integrator 510 will normally be applied as the first input to the signal strength division integrator 518, but, if the output of the narrow $\theta$ signal strength integrator 506 exceeds the certain minimum value which renders the narrow occupancy relay driver 514 conducting the output of the narrow $\theta$ gate signal strength integrator 506 will be applied as the first input to the signal strength division integrator 518.

In addition to the range gated echo pulses which are applied to the $\theta$ error detector 504, the sloping wave outputs from the one speed generator 406 are applied thereto. The $\theta$ error detector 504 produces an output pulse for each range gated echo pulse input which has a magnitude proportional to the product of the amplitude of that echo pulse and the value of the azimuth error, i.e., the difference between the time of the currents of each echo pulse and that of the crossover point of the $\theta$ sloping waves. Since the azimuth error may be either positive or negative, the output of the $\theta$ error detector 504 may be either positive or negative. The specific circuitry of the element 504 which performs the operation described, is the subject matter of a copending application of Richard N. Close and Eugene Sard, Serial No. 520,942, filed on July 8, 1955, for Radar Signal Strength and Error Multiplier Circuit. Since the specific details of this circuit form no part of the present invention they are omitted from the description.

The output of the $\theta$ error detector 504 is applied to both a wide $\theta$ gate signal strength times error integrator 520 (through a wide $\theta$ gate relay 522) and a narrow $\theta$ gate signal stength times error integrator 524 (through a narrow $\theta$ gate relay 526). The wide and narrow $\theta$ gate relays 522 and 526 respectively operate in the same manner as the wide $\theta$ gate and narrow $\theta$ gate relays 512 and 508 respectively. Either the output of the wide $\theta$ gate signal strength times error integrator 520 or the output of the narrow $\theta$ gate signal strength times error integrator 524 is selectively applied through a narrow $\theta$ gate occupancy relay 528 as a second input to the signal strength division integrator 518. The narrow $\theta$ occupancy relay 528 operates in the same manner as the narrow $\theta$ occupancy relay 516.

In addition to the first and second inputs to the signal strength division integrator 518 discussed above, trigger pulses from the radar trigger pulse generator 104 are applied as a third input to the signal strength division integrator 518.

The basic function of the signal strength division integrator is the division of one D.C. voltage (the wide or narrow gated integrated azimuth error times signal strength narrow gated integrated azimuth error times signal strength voltage from elements 520 and 524) by a second D.C. voltage (the wide or narrow gated integrated signal strength voltage from elements 506 and 510).

The specific circuit of the signal strength division integrator forms no part of the present invention. The basic function is, however, important to the system and in order to complete the disclosure the details of the circuitry necessary to accomplish this basic function are shown in FIG. 16 of the drawings.

Turning now to FIG 16, the wide or narrow gated integrated azimuth error times signal strength voltage applied to the first input of the signal strength division integrator 518 has been designated $e_1$. This is the dividend quantity for the dividing circuit. The wide or narrow gated integrated signal strength voltage applied to the second input of the signal strength integrator has been designated $e_2$. This is the divisor quantity for the dividing circuit. The third input to the division integrator 518 is the system trigger voltage which is obtained from the radar pulse trigger generator 104. The division operation is performed in the circuit by applying the voltage $e_1$ to a D.C. integrating amplifier which has a resistive feedback circuit whose effective value is made a linear function of the voltage $e_2$.

The crcuit includes an integrating condenser 1601 which is charged from the voltage $e_1$ through a series resistor 1603 and a high gain differential amplifier 1605. The voltage existing at the input of the amplifier at point X is connected as a first input to one grid of the high gain difference integrating amplifier 1605. The voltage at point X is also fed to the input of a two-stage A.C. amplifier circuit 1607 through a resistor 1609 and a condenser 1611. A chopper switch 1613 is driven by an energizing coil (not shown) between the associated contacts 1615 and 1617 at some convenient periodic rate such as 60 cycles per second. It will be apparent that the input circuit to the A.C. amplifier 1607 is periodically grounded by the chopper switch 1613 and one of its contacts 1615. This results in a square wave input to the alternating current amplifier 1607 and the resultant output therefrom is rectified by the chopper switch 1613 and the remaining contact 1617. The rectified output is smoothed in an R-C filter composed of a resistor 1619 and a condenser 1621 and then applied through a resistor 1623 to the second grid of the high gain differential integrating amplifier 1605. This circuit constitutes a stabilizing feedback for the amplifier 1605 and its purpose is to establish a virtual ground at point X. The chopper periodically compares the actual potential of point X with the potential existing at ground and develops an error voltage which acting through the A.C. amplifier 1607, the rectifier contacts, the R-C filter and the differential portion of amplifier 1605 fixes the potential of point X such that for all practical intents and purposes it may be regarded as at ground potential.

The circuit thus far described is one in which the input voltage $e_1$ is integrated over a period of time across the condenser 1601 and which may be coupled through a network consisting of a resistor 1625 and a condenser 1627 to the output circuit.

The portion of the circuit which accomplishes the division operation will now be described. This portion of the circuit is a switch which closes a discharge circuit for the condenser 1601 over a period of time which is varied in accordance with the magnitude of the second input voltage $e_2$. The voltage $e_2$ is fed through a cathode follower circuit 1631, as an input to one grid of a variable duty cycle circuit such as a cathode coupled mono-stable multivibrator 1632. The multivibrator is initially triggered by a pulse, $e_3$, applied thereto from the radar pulse trigger generator. The variable duty cycle time of the multivibrator is altered by the voltage $e_2$ so that the circuit acting under the influence of these two input voltages produces a pulsed wave output whose duration is determined by the magnitude of the voltage $e_2$.

The output of the multivibrator which is a positive going pulse is applied to an amplifier 1633 and thence to a unity gain inverter circut 1635. The positive going pulse output of the amplifier is applied to the anodes of a pair of diodes 1637 and 1639. The negative going pulse from the unity gain inverter circuit is similarly applied to the cathodes of a pair of diodes 1641 and 1643. The diodes are connected in the form of a switching circut and are rendered conducting upon the application of the positive and negative going pulses thereto as set forth above. During the pulsed output of the variable duty cycle circuit, therefore, the diode switch is closed.

A pair of resistors 1645 and 1647 have one end thereof connected to the opposite terminals of the condenser 1601. The opposite ends of the resistors are connected together and to one terminal of the diode switch circuit. The other terminal of the diode switch circuit is connected to ground as shown in the drawing. When the diode switch is closed a discharge path for the condenser 1601 is closed through resistors 1645 and 1647 and the diode switch to ground.

It will be apparent that the closure of the discharge circuit will reduce the voltage across the condenser 1601 and hence the voltage existing at the output circuit of the system, and that the reduction is proportional to the length of the time interval during which the diode switch is closed. It can be shown that the output voltage of the system, designated $e_0$ in the drawing, is equal to the quotient of $e_1$ divided by $e_2$.

Going back to the original quantities represented by the voltages $e_1$ and $e_2$ it will be apparent that the quantity $e_0$ has a physical meaning. In mathematics, the center of gravity is defined as the integral of the first moments of a plurality of individual elemental quantities relative to a fixed reference point divided by the integral of the plurality of elemental quantities themselves. Since the operation of the signal strength division integrator just described meets this definition, it is known as a center of gravity error circuit. The output voltage $e_0$ of FIG. 16 is designated as $\Delta\theta$ in the overall system and is proportional to the azimuth error. This voltage being proportional to the azimuth error is utilized to correct the position of the azimuth shaft 126 in a manner which will now be described.

The output of the wide $\theta$ gate relay driver 424 is applied to a differentiator 706. The differentiator 706 produces an output pulse in time coincidence with the lagging edge of the wide $\theta$ gate. This output pulse from the differentiator 706 is used to actuate a first trigger circuit 708, which produces an output pulse that follows the lagging end of the wide $\theta$ gate by about 30 milliseconds. The output pulse from the first trigger circuit 708, in turn actuates a second trigger circuit 710, which produces an output pulse that follows the output pulse from the first trigger circuit 708 by about 15 milliseconds. The output pulse from the second trigger circuit 710 is applied to a $\Delta\theta$ gate generator 562, which produces a gate pulse having a width of about one-tenth of a second. The $\Delta\theta$ gate voltage from $\Delta\theta$ gate generator 562 is applied to a $\Delta\theta$ sampling circuit 564.

The output of the signal strength division integrator 518 is applied as the input to the $\Delta\theta$ sampling circuit 564 through a high-low signal relay 530. The high-low signal relay 530 is energized, and therefore closed, except under special circumstances which will be discussed later. The $\Delta\theta$ sampling circuit 564 is a normally cut-off amplifier which is rendered conducting only during the presence of the $\Delta\theta$ gate from the $\Delta\theta$ gate generator 562. It therefore produces an output pulse having a duration equal to the width of the $\Delta\theta$ gate and an amplitude proportional to the $\Delta\theta$ azimuth error. As is the case with the input to the $\Delta\theta$ sampling circuit, the output therefrom may be either of positive or negative polarity depending upon the direction of the error. The output pulse from $\Delta\theta$ sampling circuit 564 is applied to the $\theta$ integrator preamplifier 136. The $\theta$ integrator preamplifier circuit is somewhat unique and the details of the input portion thereof are therefore shown in FIG. 9.

Referring to FIG. 9, the $\Delta\theta$ voltage obtained from the output of the $\Delta\theta$ sampling circuit is applied to an integrating circuit composed of a resistor 901 and a condenser 903. The voltage developed across the condenser 903 is applied to a chopper type demodulator circuit consisting of a vibrator switch 905 having a driven reed 907, a pair of stationary contacts 909 and 911 and resistors 913 and 915. The operation of the chopper network converts the D.C. voltage across condenser to an alternating control signal voltage having a relative phase dependent upon the polarity of the D.C. voltage on the condenser 903. The alternating current signal is coupled to following conventional amplifier stages (not shown) of the $\theta$ integrator preamplifier 136. This signal is coupled to the motor 123 through the search track relay 124 and the servo amplifier 122. The motor 123 rotates in a direction determined by the relative phase of the alternating signal voltage and in so doing drives the $\theta$ rate signal generator 128 which is coupled to its shaft.

The $\theta$ rate signal generator 128, which is an alternating current tachometer generator, produces an output signal proportional to its speed of rotation, and a relative phase dependent upon the direction of rotation. The generator signal is applied through search track relay 130 to the alternating current input circuit of the $\theta$ integrator preamplifier 136. As shown in FIG. 9 this alternating rate voltage is applied through a transformer 921, a coupling condenser 927 and a resistor 919 to one side of the chopper network. The chopper which has previously been described operating as an inverter to derive an alternating signal from a D.C. input voltage now operates on this signal as a synchronous rectifier. The tachometer rate voltage is rectified and is applied to the integrator condenser 903. The phasing of the rate voltage is such that when rectified in this manner the resulting output tends to discharge the integrating condenser 903.

The operating parameters of the $\Delta\theta$ sampling circuit 564, the $\theta$ rate signal generator 128 and the $\theta$ integrator preamplifier 136 are adjusted so that the azimuth shaft 126 driven by the servo motor will be driven through an angle exactly equal to the azimuth error by the time that the charge on the integrating condenser 903 has been completely dissipated by the output from the $\theta$ rate signal generator 128. Azimuth shaft 126 will therefore stop at a new position which is indicative of the corrected predicted azimuth of the selected target. It will be noted that the correction in predicted azimuth is not made during the scan of the azimuth search radar antenna 106 through the selected target, but immediately afterward.

The voltage output of the $\theta$ rate signal generator 128 serves a further purpose. A voltage divider made up of a resistor 923 and an adjustable potentiometer 925 is connected across the secondary of the transformer 921 (FIG. 9). The voltage obtained from this voltage divider is coupled into a further stage of the preamplifier (not shown) in opposition to the alternating control signal derived from the integrated voltage. This voltage acts as an anti-hunt velocity signal in a manner well known in the servo motor art.

Referring back, it was earlier stated that the $\rho$ wide or narrow relay 460 is normally in its wide position, so that the wide gate from the wide $\rho$ gate generator 456 is initially applied as a first input to the $\rho$ gated video amplifier 462. The conditions under which the $\rho$ wide or narrow relay 460 is switched from its normal wide position to its narrow position will now be discussed.

The range gated echo pulse output from the $\rho$ gated video amplifier 462 is applied to a gated step counter 464 through normally open $\theta$ wide-narrow relay 466. The $\theta$ wide-narrow relay 466 is closed only during the presence of the wide $\theta$ gate or the narrow $\theta$ gate. Just which one of the $\theta$ gates is effective at any given time will be considered later. Since the echo pulses applied as a first input to the gated step counter 464 are gated in both range and azimuth, they are known as area gated echo pulses. In addition, narrow range gates from the narrow $\rho$ gate generator and amplifier 454 are applied directly as a second input to gated step counter 464. Gated step counter 454 includes a thyratron which is fired in response to coincidence existing between the time of occurrence of the narrow range gates and three or four consecutive area gated echo pulses. The firing of the thyratron produces an output from gated step counter 454 which is applied as a first input to a mixer 468. The output from mixer 468, which is proportional to the product of the magnitudes of the first input to mixer 468 from the gated step counter 464 and a second input to the mixer 468 which has a magnitude proportional to the past range error history. This second input to the mixer 468 will be discussed in detail later. The output of the mixer 468 is applied to a normally cut-off wide or narrow $\rho$ relay driver 470. If the output from the wide or narrow $\rho$ relay driver 470, which is proportional to the input applied thereto from mixer 468, has sufficient magnitude, the $\rho$ wide or narrow relay 460 will be switched from its wide position to its narrow position.

The time constants associated with the thyratron in the gated step counter 464 are such that once fired the thyratron will stay conducting for the rest of the scan. Consequently, once the $\rho$ wide or narrow relay 460 has been switched to its narrow position it will stay there for the rest of that scan.

Referring now to the operation of the range error circuit, the same error gated video echo pulses from amplifier 462 which are applied to the gate step counter 464 are also applied to a $\rho$ error detector 344. In addition, the sloping wave outputs of comparator and sloping wave generator 314 are applied to the $\rho$ error detector 344 through extra wide $\theta$ gate 2 relays 346 and 348 respectively. The presence of the extra wide $\theta$ gate relays 346 and 348 ensures that the sloping wave outputs of comparator and sloping wave generator 314 are not applied to the $\rho$ error detector 344 when the track-while-scan channel is in its search mode of operation, nor when azimuth search radar antenna 106 is not pointing in the general direction of the selected target. The $\rho$ error detector 344 produces internally a first voltage proportional to the product of the amplitude of each area gated echo pulse and the value of one of the sloping waves at the time of occurrence of that echo pulse and another voltage proportional to the product of the amplitude of each area gated echo pulse and the value of the other of the sloping waves at the time of occurrence of that echo pulse. The difference between the first and second voltages of the $\rho$ error detector 344 is applied directly as a second input to the $\rho$ integrator 312. The amplitude of the range error pulses thus applied to the $\rho$ integrator are such that each pulse produces a correction in the output of the $\rho$ integrator 312 approximately equal to 30% of the range error then existing. Since there are about 20 echo pulses received during a scan, the entire range error is substantially corrected by the time the last video pulse is received at the end of the scan.

The output of the $\rho$ integrator circuit 312 is applied through lead A and the search-track relay 230 to an input to a $\rho$ servo amplifier 204 whose output is in turn fed to a servo motor 205. The servo motor 205 is coupled to a range shaft 206 and to the slider element of a $\rho$ (D.C.) potentiometer 208. The winding of the potentiometer 208 is connected to a source of direct current, as indicated by the positive and negative signs on the drawing, with the center point thereof at ground potential. The slider of the potentiometer 208 is electrically connected to a second input to the servo amplifier 204. The system constitutes a servo system of the null or balance type having a control input voltage applied thereto from the $\rho$ integrator 312 and developing a follow-up or balance voltage on the slider of potentiometer 208. Any servo system of the null balance type, examples of which are well known in the prior art, may be used for these elements.

The servo system just described rotates the range shaft 206 causing it to assume a position which is indicative of the corrected slant range to the selected target at any instant. As has been previously mentioned, each pulse input to the $\rho$ integrator 312 causes a correction of the output equal to about 30% of the range error then existing. This constitutes a high rate of damping for each individual error correction pulse from the range error detector 344 and permits a smoothing of the response and greater overall accuracy of the system is thus obtained.

Since the delayed search track relay 342 remains in its search position during the acquisition scan, capacitor 340 has no effect on the delayed $\rho$ sloping wave generator 332. Therefore, the input to the delayed $\rho$ sloping wave generator 332 exactly follows the output from $\rho$ integrator 312. Thus the crossover point of the delayed sloping wave output from delayed $\rho$ sloping wave generator 332, and hence the time of occurrence of the wide and narrow range gates, varies from echo pulse to echo pulse in accordance with the corrections in the output of $\rho$ integrator 312 during the acquisition scan.

This completes the description of the operation of the track-while-scan channel in its track mode of operation during the acquisition scan. It will be noted that during the acquisition scan the azimuth error circuit and the range error circuit operate to correct for the error in the range and azimuth positions initially obtained in the acquisition of the selected target. However, no velocity information nor error history information is acquired during the acquisition scan.

*Normal Track Mode of Operation After Acquisition Scan*

Immediately prior to each scan of the selected target subsequent to the acquisition scan, an erasure relay signal is applied to the narrow $\theta$ gate signal strength integrator 506, the wide $\theta$ gate signal strength integrator 510, the signal strength division integrator 518, the wide $\theta$ gate signal strength times error integrator 520 and the narrow $\theta$ gate signal strength times error integrator 524 from an erasure time delay and relay driver circuit 350. This erasure relay signal is also applied to a $\Delta \rho$ integrator 352, which has no function during the acquisition scan and which has not been previously mentioned. The erasure relay signal energizes relays within each of the integrators which short circuit the integrating circuits thereof, during the previous scan. In addition, the erasure signal is applied continuously while the scan channel is in its search mode of operation. An example of the connection of the erase relays may be seen in the signal division integrator circuit 418 of FIG. 16. The erase relay 1651 when energized closes a discharge circuit through the resistor 1653 to discharge the integrator circuit. The connection of the erase relays to the other integrator circuits is similar.

The erasure time delay and relay driver 350 consists of a time delay circuit which is energized from a point of positive potential which is applied thereto, through a normally closed extra wide $\theta$ gate 1 relay 354. This time delay circuit provides a delay of about 80% of the time for 1 complete revolution of azimuth search radar antenna 106. After this time delay, the positive potential renders operative the normally cut-off relay driver which produces the erasure relay signal. The output of the time delay circuit is shunted by a normally open extra wide $\theta$ gate 1 relay 356. From the foregoing it will be seen that, while the track-while-scan channel is in its search mode of operation an erasure relay signal will be continuously produced. However, when the track-while-scan channel is in its track mode of operation, during the presence of the extra wide $\theta$ gate the energizing positive potential will be removed and the time delay circuit will be shorted out, so that the relay driver 350 will be cut-off and no erasure relay signal will be produced. At the end of the scan of the selected target the extra wide θ gate will be removed, and after a time equal to the delay provided by the time delay circuit the erasure relay signal will again be produced. Thus, the erasure relay signal is present during only a small portion of each revolution of azimuth search radar antenna 106 immediately prior to the beginning of each scan following the acquisition scan.

The azimuth error circuit performs to provide corrections in azimuth position in the same manner in the scans following the acquisition scan as it does in the acquisition scan itself; while the range error circuit performs to provide corrections in range position in the same manner, with one difference, during scans following the acquisition scan as it does in the acquisition scan itself. This one difference in the operation of the range error circuit results from the fact that in the scans following the acquisition scan the delayed search-track relay 342 is switched to its track position, which connects the capacitor 340 in series with resistor 334. Resistor 334 is shunted by resistor 336 in series with the normally closed extra wide θ gate 2 relay 338. Resistor 334 forms with capacitor 340 an extremely long time constant circuit relative to the duration of a scan, while resistor 336 forms with capacitor 340 a short time constant circuit relative to the time between scans. This results in the input to the delayed ρ sloping wave generator 332 during a scan being maintained at the output from the ρ integrator 312 existing at the instant the normally closed wide θ gate 2 relay 338 is opened at the beginning of that scan. Therefore, none of the corrections in the output of ρ integrator 312 made during a scan affect the input applied to delayed ρ sloping wave generator 332. However, in between scans, when the extra wide θ gate 2 relay 338 is closed, capacitor 340 charges to the value of the corrected output from the ρ integrator 312. Thus, in the scans following the acquisition scan the time of occurrence of the range gates remain fixed during the scan, so that the maximum range error which can be passed to the ρ error detector 344 and which will therefore affect the output of the ρ integrator 312 during any one scan will be limited to one-half the total width of the range gates during that scan.

In addition to obtaining range and azimuth position information, beginning with the scan right after the acquisition scan, information as to range and azimuth error history and velocity information is also obtained. Although the height and elevation of the selected target are not utilized in the determination of range and azimuth position, these quantities are used in connection with the determination of velocity information. Therefore, the means by which the height and elevation of the selected target is obtained will now be discussed.

Referring back to FIG. 1, a height finder radar system is shown which consists of a height finder radar transmitter and receiver unit 144 and a height finder radar antenna system 146. The height finder radar antenna system 146 is supplied with synchro data taken from the azimuth search radar antenna synchro 110 and is controlled by this data so that the height finder antenna is always maintained in the same azimuth position as the azimuth search radar antenna 106. A conventional servo motor system may be used for this purpose.

In addition, the height finder radar antenna is driven to oscillate continually in elevation. The transmitter and receiver 144 transmits exploratory pulses from the height finder radar antenna and receives echo pulses therefrom. The slant range to a target is obtained from these pulses and this slant range quantity, when fed along with the particular elevation angle at which it was obtained to a triangle solver computer system, forms the basis for determining the height of the particular target. The output of the computer is expressed in terms of the mechanical rotation of a shaft which is proportional to the height. Shaft 147 in the present drawings is this height shaft.

The height finder radar system has been described only generally above. This system in itself is old. An embodiment of the present invention actually constructed utilized the type AN/CPS-4 radar as the height finder radar system for the track-while-scan system.

The height data output from height finder radar data resolver, as represented by rotation of the shaft 147, is used to drive a transmitter synchro 148 whose output is applied to a height data receiver synchro 210. The output of the height data receiver synchro 210 is applied to a height servo amplifier 212 and a height servo motor 213 which, in turn, rotates height output shaft 214. The height output shaft 214, is coupled in a follow-back connection to the rotor of the height data receiver synchro 210 and is also used to rotate a height (A.C.) potentiometer 216 which is energized by a 60 cycle voltage from the power supply (not shown). The slider of the height (A.C.) potentiometer 216, which produces an output voltage having a magnitude proportional to height, is applied as a first input to an AGC elevation servo amplifier 218. A ρ (A.C.) computer potentiometer 220, driven by the range shaft 206, is also energized from the 60 cycle power supply voltage and produces an output having a magnitude proportional to the slant range. The output from the ρ (A.C.) computer potentiometer 220 is applied to a ρ (A.C.) sin φ resolver 222. An elevation shaft 224 is also coupled to the ρ (A.C.) sin φ resolver 222. The output of the ρ (A.C.) sin φ resolver 222 is applied as a second input to AGC elevation servo amplifier 218. The output from the AGC elevation servo amplifier 218, which is proportional to the difference between its first and second inputs, is applied as an input to an elevation servo motor 219 which rotates elevation shaft 224. Elevation shaft 224 will stop rotating at the position where the output from the ρ (A.C.) sin φ resolver 222 is equal to the output from the height (A.C.) potentiometer 216. Since the sine of the elevation angle component of slant range is equal to height, the position at which elevation shaft 224 stops will be indicative of the elevation angle of the selected target.

In order to maintain a proper gain in the servo loop which rotates elevation shaft 224 for all values of the magnitude of the slant range or the elevation angle, a portion of the output from AGC elevation servo amplifier 218 is modified as a gain control voltage for the amplifier. This voltage is applied to an elevation servo AGC potentiometer 228 which is rotated by range shaft 206. The output of the elevation servo AGC potentiometer 228 is then applied as an input to a cos φ potentiometer 232 which is rotated by the elevation shaft 224. The output from cos φ potentiometer 232 is applied as a control voltage input to AGC elevation servo amplifier 218 to vary the gain of this amplifier to make it inversely proportional to ρ cos φ. This control which operates in a manner similar to conventional automatic volume control loops may be achieved by rectifying the control voltage and applying it as a bias to variable gain tubes.

The above AGC loop automatically operates to properly adjust the gain of the servo system to meet the requirements of existing conditions. It will be remembered that one of the inputs to the amplifier 218 is dervied from the slant range voltage passed through the sin φ resolver to produce a ρ sin φ term. It will be obvious that if the slant range is long and the ρ voltage is large only a small angular correction of the shaft is necessary to correct the error. Therefore, under these conditions a large proportion of the output voltage as determined by the setting of the AGC potentiometer 228 is used to reduce the gain of the amplifier 218. At small ranges a greater correction is required so that a smaller portion of the voltage is used for gain reduction. Similarly the sine of the angle φ factor introduced by the resolver 222 is not linear. At small angles, near the horizontal or 0°, the sine term changes very rapidly with changes in the angle φ. Consequently, only a small response of the servo system is required, and therefore a large portion of the output voltage as determined by the setting of the cos φ potentiometer is fed back for gain reducing purposes. At large angles approaching the perpendicular or 90° the change in the sine term with a change in the angle φ is much smaller and the feedback voltage is reduced accordingly.

Velocity and past error history information are derived from the stored net azimuth and range error voltages which exist after each scan of the selected target. The Δθ or azimuth error voltage is obtained from the output of the signal strength division integrator 518 and is applied over the contacts of a high-low signal relay 530 and an extra wide θ gate relay 534 to a potentiometer 532. The movable contact of the potentiometer 532 is coupled to and positioned by the range shaft 206. The output voltage from the potentiometer 532 is proportional to the product of the azimuth error (Δθ) and the slant range (ρ). In terms of a physical quantity this product is equal to the tangential component of the target error (see FIG. 11). The ρΔθ voltage is fed as an input to a tangential error rate (ρΔθ) sampling circuit 536 and to a tangential error magnitude (|ρΔθ|) sampling circuit 718.

In a similar fashion the error pulse output of the ρ error detector 344, besides being applied as an input to the ρ integrator 312, is applied to a range error (Δρ) integrator circuit 352 through the contacts of an extra wide θ gate 2 relay 358. The Δρ integrator circuit 352 supplies an output proportional to the net range error on each scan and this output voltage is applied over lead B through an extra wide θ gate 2 relay 724 to a range error rate (Δρ) sampling circuit 820 and a range error magnitude (|Δρ|) sampling circuit 722.

The output from the previously described first trigger circuit 708 is used to trigger an error magnitude (|Δρ| and |ρΔθ|) gate generator 726 which produces a square output pulse having a width of about 500 microseconds. The output from the previously described second trigger circuit 710 is used to trigger a range error rate (Δρ) gate generator 828 and a tangential error rate (ρΔθ) gate generator 830, each of which produces a square output pulse having a width between 200 and 2000 microseconds. The width of these last named pulses is controlled by first and second velocity damping signals which are applied to the gate generators 828 and 830 respectively. These velocity damping signals which enable the error rate gate voltages to control their associated circuits so as to sample velocity information, will be discussed later.

The output from the range error rate gate generator 828 is applied as a gate input to the Δρ sampling circuit 820 and the output from the tangential error rate gate generator 830 is applied as a gate input to the ρΔθ sampling circuit 536. The outputs from the Δρ sampling circuit 820 and the ρΔθ sampling circuit 536 consist of square wave pulses having a width equal to the respective gates applied thereto and an amplitude and polarity proportional to the respective error signals applied thereto.

The output from the Δρ sampling circuit 820 is applied as an input to a Δρ resolver driver 602. The output from ρΔθ sampling circuit 536 is applied to a ρΔθ velocity gate times cos φ potentiometer 604, which is rotated by the elevation shaft 224. The amplitude of the output from ρΔθ velocity gate times cos φ potentiometer 604 is proportional to RΔθ (where R denotes ground range, rather than slant range), and is applied to an RΔθ resolver driver 606. Δρ represents the radial component of the velocity error of the slant range to the selected target and RΔθ represents the tangential component of the azimuth velocity error of the selected target. In an actual system constructed in accordance with the principles of this invention, it has been determined that the quantity ρΔθ is sufficiently close to that of RΔθ for all normal elevation angles to permit the omission of the cos φ multiplier potentiometer element without introducing any serious error in the overall result.

The outputs from the Δρ resolver driver 602 and the RΔθ resolver driver 606 are applied to the stator windings 610 and 612 respectively of a velocity error resolver 608. The velocity error resolver 608 as illustrated schematically on the drawing has a first main stator winding 610 and a second main stator winding 612 located at an angle of 90° with respect to one another. The output of the resolver drivers, it will be remembered, is a rectangular pulsed wave and in order to maintain this rectangular waveform in the resolver stator feedback windings 614 and 616 are also provided. The stator feedback windings 614 and 616 are magnetically linked to their respective stator windings 610 and 612, and each has approximately the same transformation ratio, leakage inductance and stray capacitance to its stator winding as the rotor windings 618 and 620 have to the stator windings. Each feedback winding is coupled back, as illustrated, in a degenerative manner to the resolver driver circuit which feeds the respective stator winding. The resolver drivers 602 and 606 constitute unity gain feedback amplifier systems which cause the resolver to faithfully reproduce the waveform of the square wave input to the driver elements.

The velocity error resolver 608 has a pair of rotor windings 618 and 620 also located at 90° with respect to one another. The rotor structure is mechanically coupled to and driven by the azimuth shaft 126. The velocity error resolver 608 operates in a known manner to resolve the polar coordinate input thereto into rectangular component voltages proportional to the east-west (Ẋ) and north-south (Ẏ) components of the velocity error input. As previously described, the output voltages preserve their original input waveform.

The ΔẊ velocity error output from velocity error resolver 608 is applied as an input to a ΔẊ voltage and current amplifier and charging circuit 622 while the ΔẎ velocity error output from velocity error resolver 608 is applied as an input to a ΔẎ voltage and current amplifier and charging circuit 624. The inputs to the ΔẊ voltage and current amplifier 622 and the ΔẎ velocity and current amplifier 624 are normally grounded through extra wide θ gate 1 relays 626 and 628 respectively. Therefore, input signals can be applied to amplifiers 622 and 624 only during the presence of the extra wide θ gate.

The circuit diagram of a portion of the voltage and current amplifier 622 and its connection to an integrator circuit 630 are shown in FIG. 13. The circuit of the voltage and current amplifier and charging circuit 624 is identical to that of element 622. The voltage output of the velocity error resolver 608 which represents the ΔẊ coordinate is an alternating square wave voltage. This voltage is fed to element 622 where it passes through a conventional amplifier circuit not shown and is then applied through a condenser 1301 to the input of the charging circuit shown in FIG. 13. The purpose of the charging circuit is to reestablish the original input voltage in terms of its proper D.C. polarities.

The input voltage is coupled to the grid resistor 1303 of a tube 1305, the anode-cathode circuit of which is included in a voltage divider circuit which further includes tube 1307 and resistors 1309, 1311, 1313 and 1315. This voltage divider circuit is connected across the positive and negative supply terminals and has its output coupled at the junction between the anode of tube 1305 and the resistor 1313. The static operating conditions of the voltage divider circuit are established by a further voltage divider string consisting of resistors 1303, 1317, 1919, 1321 and 1323 connected in series from the positive voltage supply terminal to the junction of resistors 1309 and 1311 and having a ground tap between resistors 1317 and 1319. The output terminal connected to the junction of resistor 1313 and the anode of tube 1305 will thus swing positive with respect to ground in response to a negative going input voltage applied to the grid of tube 1305 and will swing negative with respect to ground in response to a positive going input signal. In the absence of any input signal the junction point will be at ground potential.

The potential at the junction point is coupled through a pair of condensers 1325 and 1327 to a pair of circuits operative to establish the positive or negative going input signals in terms of positive or negative D.C. pulses to the input of an integrator circuit 630. Assume a positive going pulse is applied to the grid of tube 1305. The junction point swings more negative with respect to ground. A voltage divider made up of resistors 1331 and 1333 connected through a resistor 1329 normally holds the output terminal of condenser 1325 at a positive potential and maintains a circuit including a resistor 1341 and a diode 1343 in non-conducting condition. Similarly a voltage divider made up of resistors 1335 and 1339 connected through a resistor 1337 normally holds the output terminal of the condenser 1337 at a negative potential and maintains a circuit including a resistor 1345 and a diode 1347 in a non-conducting condition. When the positive going signal pulse swings the potential of both condenser input terminals in a negative direction the circuit including resistor 1341 and diode 1343 becomes conductive and the potential at the output terminal of condenser 1325 swings in a negative direction due to the voltage drop across the resistor 1341. The negative pulse thus produced is coupled through a resistor and a blocking diode 1353 to the input of the integrator circuit 630. A similar action takes place upon the occurrence of a negative signal pulse except that the circuit including diode 1347 becomes conductive to pass a positive pulse through a blocking diode 1355 to the integrator. The signal pulses described above have undergone a phase inversion in passing through the resolver and amplifier before application to the charging circuit. It will be apparent therefore, that the charging circuit produces positive or negative pulses for application to the integrator 630 which preserve the sense and magnitude information of the original velocity error signals.

The integrating portion of the amplifiers 164 and 166 may be of the type previously described in connection with FIG. 16, omitting however, the alternating current discharge feature. Each of the integrating amplifiers 630 and 632 also includes a normally open relay, similar to relay 1651 of FIG. 16, for short circuiting the integrating circuit thereof. These relays are energized by a delayed search-track relay excitation signal which is applied to them. This ensures that neither integrating amplifier 630 nor 632 produces an output when the delayed search track relay excitation signal is present. Since the delayed circuit track relay excitation signal is present while the track-while-scan channel is in its search mode of operation and for the acquisition scan, integrating amplifiers 630 and 632 will produce no output at these times.

The outputs from the $\dot{X}$ and $\dot{Y}$ integrating amplifiers 630 and 632 respectively are applied as inputs to the $\dot{X}$ and $\dot{Y}$ (A.C.) modulating amplifiers 634 and 636 respectively. Each of the $\dot{X}$ and $\dot{Y}$ (A.C.) modulating amplifiers 634 and 636 includes a 60 cycle chopper which converts the direct current input thereto to a square wave alternating current output therefrom. The outputs from the $\dot{X}$ and $\dot{Y}$ (A.C.) modulated amplifiers 634 and 636 respectively are applied as inputs to stator windings 642 and 644 of a velocity resolver 638, having rotor windings 648 and 650 rotated by the azimuth shaft 126. Velocity resolver 638 includes two rotor windings placed at right angles with respect to each other and two stator windings also oriented at right angles with respect to each other. The velocity resolver 638 also includes stator feedback windings 644 and 646 similar to those described in connection with the velocity error resolver 608. The outputs from these windings are fed back to the driving A.C. amplifiers 634 and 636 to maintain the resolver waveform. The velocity resolver 638 converts the rectangular coordinate inputs back into polar coordinates. The use of a rectangular coordinate circuit utilizing D.C. voltages between the velocity error resolver 608 and the velocity resolver 638 permits the incremental velocity errors on successive scans of the selected target to be added directly by the $\dot{X}$ and $\dot{Y}$ integrating amplifiers 630 and 632. The integrators are exponential decay integrators with constants such that decay is 50 percent during a scan interval. This results in a velocity error signal memory in which there is 100 percent memory of error for the present target scan, 50 percent for the last scan, 25 percent for the scan before the last, etc.

One output from the velocity resolver 638, which is proportional to the predicted radial ground velocity is applied to a ground range velocity error or $\dot{R}$ (A.C.) amplifier 652. The output of the $\dot{R}$ (A.C.) amplifier 652 is applied to a $\dot{R}$ (A.C.) cos $\phi$ potentiometer 654, which is rotated by the elevation shaft 224. The potentiometer performs a division operation by multiplying the ground range signal by the reciprocal of the cosine of the elevation angle $\phi$ and the output of potentiometer 654 is proportional to the slant range component of the velocity of the selected target. This output is applied to a slant range velocity error or $\dot{\rho}$ (A.C.) phase responsive amplifier demodulator 540, which amplifies the $\dot{\rho}$ (A.C.) input thereto and then demodulates it to provide a direct current output proportional to $\dot{\rho}$. This direct current output from $\dot{\rho}$ (A.C.) amplifier demodulator 540 is applied over lead C to an input of the $\rho$ integrator 312 through resistor 360. Resistor 360 has a high value so that the integrator circuit of the $\rho$ integrator 312 is charged at a substantially constant rate proportional to the magnitude of the range velocity output of $\dot{\rho}$ (A.C.) amplifier demodulator 540. Therefore, immediately following the next scan of the selected target after the acquisition scan, the output of the $\rho$ integrator 312 will continuously vary at a rate determined by the magnitude of the radial velocity or $\dot{\rho}$, and this will cause range shaft 206 to rotate in accordance with the predicted range velocity of the selected target.

The other output from the velocity resolver 638, which is proportional to the tangential component of ground velocity, is applied to tangential velocity error or $R\dot{\theta}$ (A.C.) amplifier 656. The output of $R\dot{\theta}$ (A.C.) amplifier 656 is applied to a $$\frac{R\dot{\theta} \text{ (A.C.)}}{\rho}$$

potentiometer 544, which is rotated by the range shaft 206. The output of potentiometer 544 is applied to $$\frac{R\dot{\theta} \text{ (A.C.)}}{\rho}$$

times secant $\phi$ potentiometer 658, which is rotated by the elevation shaft 224. The output of potentiometer 658 which is proportional to the angular velocity rate or $\dot{\theta}$ (A.C.), is applied to a $\dot{\theta}$ (A.C.) amplifier demodulator 548. The $\dot{\theta}$ (A.C.) amplifier demodulator 548 is a phase responsive circuit similar to the $\dot{\rho}$ (A.C.) amplifier demodulator 540 and produces a direct current output proportional to $\dot{\theta}$. The output from the $\dot{\theta}$ amplifier output demodulator 548 is applied over lead D as an input to the $\theta$ integrator preamplifier 136. The azimuth velocity input to the $\theta$ integrator preamplifier 136, which acts in a similar manner to the range velocity input to the $\rho$ integrator 312, causes the azimuth shaft 126 to rotate in accordance with the predicted azimuth velocity of the selected target.

The apparatus for obtaining the past error history voltages of the system will now be described. The gate from $|\Delta\rho|$ and $|\rho\Delta\theta|$ gate generator 726 is applied as a second input to both a range error or $|\Delta\rho|$ sampling circuit 722 and a tangential error or $|\rho\Delta\theta|$ sampling circuit 718. The outputs from the $|\Delta\rho|$ sampling circuit 722 and the $|\rho\Delta\theta|$ sampling circuit 718 are square wave pulses having a width equal to the gate from the $|\Delta\rho|$ and $|\rho\Delta\theta|$ gate generator 726 and amplitudes respectively proportional to $\Delta\rho$ and $\rho\Delta\theta$, the radial and tangential errors in slant range respectively. These pulses may be either positive or negative depending upon the existing error at the particular instant. The output of $|\Delta\rho|$ sampling circuit 722 is applied to a phase splitter or inverter circuit 734, which regardless of the polarity of the input thereto produces a negative output pulse and a positive output pulse each having a magnitude proportional to the absolute value of $\Delta\rho$. The output of $\rho\Delta\theta$ sampling circuit 718 is applied to a similar phase splitter or inverter circuit 736, which produces a negative output pulse and a positive output pulse each having a magnitude proportional to the absolute value of $\rho\Delta\theta$.

The positive and negative outputs of the phase splitter circuit 734 are applied to a $|\Delta\rho|$ integrator circuit 738, one directly and the other through a normally closed delayed search-track relay 740, and the positive and negative outputs of phase splitter circuit 736 are applied to a $\rho\Delta\theta$ integrator circuit 742, one directly and the other through a normally closed delayed search-track relay 744. The circuit of the phase splitter 736 and the inputs to the $|\rho\Delta\theta|$ integrator circuit 742 are shown in FIG. 12. It will be noted that the phase splitter 736, which receives the gated $|\rho\Delta\theta|$ pulses, consists of a conventional resistance coupled amplifier tube 1203 followed by a conventional phase splitter circuit including tube 1205. The anode of the phase splitter tube is coupled through a condenser and a resistor 1207 directly to one input of the integrator 742. The cathode of the phase splitter tube 1205 is coupled through a condenser, the contacts of the delayed search-track relay 740 and a resistor 1209 to a second input to the integrator 742. The two inputs to the circuit 742 are coupled through a pair of diodes 1211 and 1213 to the integrator circuit not shown. It can thus be seen that regardless of the polarity of the input $|\rho\Delta\theta|$ only a negative pulse is coupled to the integrator of circuit 742. The integrator circuit used is similar to that shown in FIG. 8 with the alternating current discharge feature omitted. The circuit of elements 734 and 738 is identical to that of elements 736 and 742.

When the track-while-scan channel is in its search mode of operation and during the acquisition scan, a fixed negative potential is applied to the integrators 738 and 742 through delayed search track relays 740 and 744 (see the potentiometer 1215 of FIG. 12). Therefore, at the instant the delayed search track relays 740 and 744 are closed the integrating circuit of each of the integrators 738 and 742 has an initial charge thereon equal to the magnitude of this negative potential.

Immediately following every scan after the acquisition scan the integrating circuit of the $|\Delta\rho|$ integrator 738 is charged by the output pulse from the phase splitter circuit 734, and the integrating circuit of the $|\rho\Delta\theta|$ integrator 742 is charged by the output pulse from the phase splitter circuit 736.

The $|\Delta\rho|$ integrator 738 and the $|\rho\Delta\theta|$ integrator 742 each contain a discharge network normally shunting the integrating circuit thereof. The constants of this discharge network are such that in the time interval between consecutive scans approximately one-half of the charge on the integrating circuit will be discharged. Therefore, the outputs from the $|\Delta\rho|$ integrator 738 and the $|\rho\Delta\theta|$ integrator 742 will provide past error histories, weighted as a function of time; that is, the total of the weighted past errors of the radial and tangential components of the position of the selected target respectively. The initial charge on the integrating circuits of integrators 738 and 742, which has a magnitude proportional to the fixed negative potential applied thereto when delayed search track relays 740 and 744 are in their search position, results in the initial outputs from integrators 738 and 742 immediately following the closing of delayed search track relays 740 and 744, simulating large past error histories.

The slant range error history as represented by the output of the $|\Delta\rho|$ integrator 738 is applied as an input to both a wide $\rho$ gate width mixer 746 and a $|\Delta\rho|$ velocity damping mixer 832. The tangential error history as represented by the output from $|\rho\Delta\theta|$ integrator 742 is applied to a $$\left|\frac{\rho\Delta\theta}{\rho}\right|$$

potentiometer 834, which is rotated by range shaft 206 to perform the indicated voltage division. The output from $$\left|\frac{\rho\Delta\theta}{\rho}\right|$$

potentiometer 834 which is proportional to the azimuth error history is applied to a $|\Delta\theta|$ velocity damping mixer 836 and $\rho\Delta\theta$ gate width mixer 626. The function of the mixers 836 and 626 is to control the gate width generated by circuit elements 828 and 830 controlled respectively thereby.

The output from the $|\Delta\rho|$ velocity damping mixer 832, which for normal tracking of the selected target is proportional to the output from the $|\Delta\rho|$ integrator 738, is applied as the width control signal to a $\Delta\rho$ gate generator 828; and the output from the $|\Delta\theta|$ velocity damping mixer 836, which for normal tracking of the selected target is proportional to the output from the $|\rho\Delta\theta|$ integrator 742 divided by the slant range, is applied as the width control signal $\rho\Delta\theta$ gate generator 830. For normal tracking of the selected target, the width of the gates generated by each of the velocity error gate generators 828 and 830 respectively are a linear function of the past range and azimuth error histories respectively.

The output from the $|\Delta\rho|$ integrator 738 is applied to a wide $\rho$ gate width mixer circuit 746. The wide $\rho$ gate width mixer circuit 746 is also fed with the integrated output from an occupancy triggered integrator or fade-voltage circuit 754 the input to which is derived from the $\theta$ gated output of the signal strength integrators 506 and 510 through an occupancy charging circuit 840.

During normal tracking conditions the output of the wide $\rho$ gate width mixer circuit 746, which may be a conventional adding amplifier, is proportional to the output from the $|\Delta\rho|$ integrator 738. This voltage which is negative is applied as the previously mentioned width control signal to the wide $\rho$ gate generator 456. The width of the wide $\rho$ gate is linearly controlled in accordance with the magnitude of the past range error history negative voltage.

The output from the wide $\rho$ gate width mixer 746 is also applied to a mixer circuit 468 which is connected between the gated step counter 464 and the $\rho$ wide narrow relay driver 470. Mixer 468, which is again an adding amplifier circuit, adds the voltage inputs thereto algebraically. Thus, if the past error signal $|\Delta\rho|$ which is a negative voltage is sufficiently large, indicating large past errors, the signal from the gated step counter 464 will not be effective to actuate the $\rho$ wide-narrow relay driver 470. In this case the $\rho$ wide-narrow relay 460 is not energized and the system continues to operate on the $\rho$ wide gate voltage from the $\rho$ wide gate generator 456 until the past range error history voltage $|\Delta\rho|$ has been reduced. The system cannot switch to narrow range gate operation until this has been accomplished.

Referring back, the output of the $\rho$ integrator circuit 312 is applied to a rough $\rho$ driver amplifier 362. The output from the rough $\rho$ driver amplifier, which is grounded through a condenser 340 when the delayed search track relay 342 is in its search position, is applied as an input to a rough $\rho$ inverter circuit and amplifier circuit 748. The rough ρ inverter circuit includes a phase inverter or splitter circuit and produces a pair of output voltages. One output voltage which corresponds to the inverted rough ρ voltage is applied to a wide θ gate minimum width clamp circuit 750. The other output voltage which is not inverted is applied to one input of a ρΔθ gate width mixer circuit 626.

The circuit 752 may be a conventional summing or adding amplifier, and it is supplied with a second input voltage. The second input is derived by the application of the output from the |ρΔθ| integrator circuit 742 to the potentiometer 834. The slider of the potentiometer 834 is coupled to and driven by the range shaft 206. The voltage output of the |ρΔθ| integrator as previously explained is proportional to the magnitude of the past tangential error history and this voltage is modified in the potentiometer to multiply it by the reciprocal of the range or $$\frac{1}{\rho}$$

This modified voltage which is largely representative of the reciprocal of the slant range, is applied as the second input to the ρΔθ gate width mixer circuit 752.

The output of the ρΔθ gate width mixer circuit is applied through a wide θ gate width control amplifier 754 to the width control input of the wide θ gate generator 418 and also to the input of a wide-narrow θ relay driver circuit 756. The inverted output of the rough ρ inverter circuit is applied through a wide θ gate minimum width clamp circuit 750 to a narrow θ gate control circuit 758. The gate control circuit 758 is a conventional direct current amplifier circuit whose output is applied to the control input of the narrow θ gate generator 416. The wide θ gate minimum width clamp circuit 750 has a second output which is connected to the output of the wide θ gate width control circuit 754 and also to the control input of the wide θ gate generator 318. The purpose and the mode of operation of these circuits will now be described.

The ρΔθ mixer circuit 752 during normal operation of the system produces an output voltage which is primarily proportional to the reciprocal of the slant range. It will be remembered that this voltage originally derived from the |ρΔθ| integrator 742 is always negative in polarity. The wide θ gate width control circuit 754 includes a bias potentiometer normally applying a low negative voltage to the wide θ gate width control lead and the wide-narrow θ relay driver circuit 756. The voltage output of the mixer circuit 752 is added to this bias voltage. If the $$\frac{1}{\rho}$$

quantity is large indicating a small magnitude of slant range a large negative signal is passed by the mixer 752 which increases the negative voltage applied to the width control input of the circuit 418. The large negative signal increases the width of the wide θ gate. It will be apparent that for small values of range wide gates are necessary. If the range increases the value of $$\frac{1}{\rho}$$

becomes smaller and the negative control signal diminishes proportionally. The gate width decreases accordingly.

The combined negative signal and bias voltage described above is also applied to the input circuit of the wide narrow θ relay driver 756. When a sufficiently small negative signal occurs, that is under long range conditions, the input tube of the relay driver circuit becomes conducting to energize the wide-narrow θ relay 472. Energization of this relay switches the track-while-scan system to operation on the narrow θ gate voltage rather than the wide θ gate voltage.

The inverted rough ρ voltage output from circuit 748 operates in a somewhat similar manner to control the width of the narrow θ gate. The rough ρ input voltage is of negative polarity. Upon inversion it becomes a positive signal. The positive signal is applied through the wide θ gate minimum width clamp circuit to the narrow θ gate control circuit 758. Circuit 758 includes a bias potentiometer which in the absence of a control signal applies a small positive bias to the width control input to the narrow θ gate generator 416. The control signal is added to this bias voltage. Assuming a large magnitude of slant range to the selected target the control signal is large and adds to the positive bias forcing the control input to the narrow θ gate generator far in a positive direction to narrow the generated gate. If the rough ρ signal decreases the positive control input voltage which causes the gate to increase in width. It will be noted that again wider gates are used for short ranges and narrower gates for long ranges.

As described above, the output of the wide θ gate control circuit 754 and the second output from the wide θ gate minimum width clamp circuit 750 are connected together and applied as an input to the wide θ gate width control input of gate generator 418 and the wide-narrow θ relay driver circuit 756. The second output of the clamp circuit 750 includes a diode (not shown) which during normal tracking is biased to a non-conducting state by the output voltage of the wide θ width control circuit 754. This voltage is of course proportional to the past azimuth error history and the reciprocal of the slant range. However, should the output voltage from circuit 754 fall below a certain minimum value indicating a long range, the diode becomes conducting and enables the wide θ gate minimum width clamp circuit 750 to apply its second output to the gate width control input of the wide θ gate generator 418. This sets a minimum width for the wide θ gate generator below which it cannot be reduced regardless of the value of the reciprocal slant range input voltage.

A narrow θ gate relay driver circuit 420 is excited by the output from the narrow θ gate generator over the contacts of an extra wide θ gate relay 422, while a wide θ gate relay driver circuit 424 is similarly fed from the wide θ gate generator over the contacts of extra wide θ gate relay 426. The relay driver circuits energize their respective relays. The output of the narrow θ gate relay driver circuit is also normally applied over the contacts of the wide narrow θ relay 472 to the input of a θ wide-narrow relay driver circuit 474. When the wide-narrow θ relay 472 is energized however, the wide θ gate relay excitation signal from the wide θ gate relay driver circuit 424 is applied to the θ wide-narrow relay driver circuit 474 over the other contacts of relay 472. The various relay driver circuits all have their energization signal intervals determined by the respective gate generators from which they are fed. Thus, the wide-narrow relay driver circuit has an output for the duration of the narrow θ gate when relay 472 is deenergized but has a duration of the wide θ gate when the relay 472 is energized.

The output from the θ wide-narrow relay driver 472 is used to energize θ wide-narrow relays 466 and 476. The θ wide-narrow relay 466 is used as previously described to gate in azimuth the range gated echo pulse output from the ρ gated video amplifier 462 to provide area gated echo pulses. The output from the wide-narrow cathode follower circuit 458, besides being applied as the range gate voltage to the video amplifier 462, is applied over the contacts of the θ wide-narrow relay 476 when it is energized to the plan-position-indicator 108. This input to the plan-position-indicator which consists of the wide or narrow range gates which occur during the existence of the wide or narrow azimuth gates as the case may be, is used to provide an area marker centered about the predicted range and azimuth of the selected target on the face of the plan-position-indicator tube.

Abnormal Track Mode of Operation After the Acquistion Scan

The previous section of the description dealt with the operation of the track-while-scan system after the acquisition of a selected target when normal tracking conditions exist. This section will describe the special features which are provided for the control of the track-while-scan system under abnormal or unusual tracking conditions. Means are provided to combat the effect of excessive signal strength such as that due to side lobes, adjacent targets, cloud reflections, noise or other causes. Means are also provided to correct for loss of the selected target from either the range or azimuth gates of the system.

The means which operates upon abnormal variations in signal strength will be described first. The system as previously described includes the signal strength integrators 506 responsive to echo pulses occurring during the narrow azimuth gates and 510 responsive to echo pulses occurring during the wide azimuth gates. The output of one or the other of these integrators is applied through the contacts of the narrow $\theta$ occupancy relay 516 to a high signal flip-flop relay driver circuit 762 and to a low signal relay driver circuit 764. The operation of the narrow $\theta$ occupancy relay 516, which chooses the particular integrator output to be used, has been previously described.

The selected signal strength integrator output is applied to the input of the high signal flip-flop circuit 762, a partial schematic of which is shown within the block diagram. This circuit includes a first normally conducting branch having a first relay coil 414', a second relay coil 760', and a triode series connected therein. The input voltage is applied to the grid circuit of the triode. So long as the negative integrated signal strength voltage remains below a predetermined value the triode continues to conduct. Should the integrated voltage rise above this value, the triode is cut off removing the excitation from the relay coils 414' and 760'. The high value of integrated signal strength, which is above that normally obtained, is due to some spurious input which should not be relied on, such as response due to side lobes, reflected pulses from targets adjacent to that selected, noise or other factors.

The relay coil 414' is the actuating coil for the high signal relay 414, whose contacts open upon deenergization of the coil to remove the excitation signal from the extra wide $\theta$ gate 2 relays 338, 346, 348, 358, 534 and 724. The extra wide $\theta$ gate 2 relays thus remain open during any scan of the target where excessive signal strength causes reversal of the normal conditions of the flip-flop driver circuit 762. This results in removal of signals from the track-while-scan system so that no range position or range velocity corrections are made during the scan.

When normal tracking conditions are restored and the integrated signal voltage drops, the flip-flop relay driver circuit 762 returns to its original condition and the track-while-scan channel resumes tracking. Thus, for the duration of the excessive integrated signal the track-while-scan channel does not respond to any new data of the selected target provided by the search radar and maintains the past range and azimuth error histories at the respective values they had when the period of excessive integrated signal strength began.

Removal of energization from the relay coil 760' allows the contacts of a relay 760 to close. The closure of these contacts applies a relay energizing voltage to internal relays (not shown) contained within the $|\Delta\rho|$ integrator circuit 738 and the $|\rho\Delta\theta|$ integrator circuit 742. These internal relays upon energization disconnect the discharge networks which shunt the integrators. Upon the occurrence of an excessive signal condition therefore, the voltage existing on these integrators will be preserved and not allowed to decay in the normal manner.

Although the track-while-scan channel does not respond to range and azimuth velocity errors during the excessive signal strength period, the selected target continues to be tracked at the velocity indicated by the integrated outputs of the $\dot{X}$ and $\dot{Y}$ integrating amplifiers 630 and 632.

The output of the signal strength integrators 506 or 510 is also applied to the input of a low signal relay driver circuit 764, a partial schematic diagram of which is included in the block diagram. The low signal relay driver circuit consists of a vacuum tube having a relay coil included in its plate circuit. An integrated signal of normal value is sufficient to maintain the tube in a non-conducting state. Should the integrated signal strength fall off to approximately one-third its normal value it should not be regarded as furnishing reliable information. The tube is therefore biased to become conductive when the integrated signal strength drops to this level. When this occurs the relay coil 530' is energized to open the contacts of the low signal relay 530. Opening of these contacts removes the integrated signal strength input from the $\Delta\theta$ sampling circuit 564 and the $\rho\Delta\theta$ sampling circuit 536. When the low signal condition occurs, therefore, no corrections in the predicted azimuth position or azimuth velocity error will be made during the scan.

The integrated signal strength voltage is also applied over the contacts of an extra wide $\theta$ gate 1 relay 766 to the input of a $\theta$ occupancy amplifier and differentiator circuit 840. The input is in the form of a pulse having a duration equal to the extra wide $\theta$ gate width and a magnitude equal to the integrated signal strength. The occupancy amplifier and differentiator circuit 840 amplifies this pulse and differentiates it to produce a positive output pulse in time coincidence with the lagging edge of the extra wide $\theta$ gate and having a magnitude proportional to the integrated signal strength.

The circuitry accomplishing this function is well known and need not be specifically described. This output pulse is applied as an input to an occupancy triggered integrator circuit 838. The occupancy triggered integrator circuit 838 consists of a thyratron tube having its anode connected through a resistance to a positive terminal of a source of direct current and its cathode connected through a second resistance to a negative terminal of the source. Both the anode and cathode are connected to ground, or the mid-tap of the source of direct current, through condensers. The anode condenser is shunted by a diode with its cathode connected to the thyratron anode and the cathode condenser is shunted by a diode having its anode connected to the thyratron cathode.

The plate and cathode resistors of the thyratron together with their associated condensers form integrating circuits having long time charging characteristics. The integrating circuits have practically instantaneous discharge circuits provided by the shunting diodes.

The occupancy triggered integrator circuit just described has a positive input pulse applied to the grid of the thyratron from the $\theta$ occupancy amplifier and differentiator 840. The positive pulse causes the thyratron to become conductive with the result that its anode and cathode assume certain fixed potentials intermediate the values of positive and negative potentials of the direct current source. Following the pulse, the voltage across the thyratron is insufficient to maintain conductivity and the tube is extinguished. The condenser connected to the anode tends to charge toward the potential of the positive terminal of the source, while the condenser connected to the thyratron cathode tends to charge toward the potential of the negative terminal of the source. On the next scan the thyratron will be again fired by a positive pulse applied thereto, returning the anode and cathode thereof to their original intermediate potentials, the condensers discharging rapidly at this time through their shunting diodes.

It will be apparent that so long as the thyratron continues to fire on each scan, the potentials at the anode and cathode will have a rough saw-tooth waveform having a duration equal to the time between successive scans. The anode voltage will vary from a low potential at the instant of firing of the thyratron to a potential intermediate that voltage and the voltage of positive terminal of the direct current source. Similarly the cathode potential will vary from a "high" at the instant of thyratron firing in a negative direction toward the potential of the negative terminal of the direct current source. These voltages constitute the two output voltages of the integrator.

Should the selected target be lost from the azimuth gate for one or more scans of the system the thyratron will not be triggered since there will be no integrated signal strength voltage during these scans. The anode and cathode of the thyratron will continue to "rise" in potential toward that of the positive and negative terminals of the source respectively. Since the integrating circuits have very long time constants, the magnitude of the "rise" in potential of the anode and cathode depends upon the number of scans when no trigger voltage is applied to the thyratron.

The occupancy triggered integrator thus produces two output voltages, a first being the voltage of the thyratron anode and a second being the voltage of the thyratron cathode. The first or anode output voltage is coupled to a fade relay driver circuit 842, an automatic dump relay driver circuit 802, the wide $\rho$ gate width mixer circuit 746 and the $\rho\Delta\theta$ mixer circuit 752.

The fade relay driver circuit 842 comprises a tube circuit normally biased to cut-off which is rendered conducting by the application of a positive voltage of a predetermined magnitude thereto. The requisite positive voltage is developed by the thyratron anode after a preset number of scans without the application of a trigger voltage. The preset number of scans may be made as little as one, if so desired. Energization of the fade relay driver circuit opens the contacts of a fade relay 758 and the opening of these contacts, in turn, interrupts the energization circuit for internal relays (not shown) contained within the $|\Delta\rho|$ integrator circuit 738 and the $|\rho\Delta\theta|$ integrator circuit 742. Deenergization of the internal relays causes the opening of the discharge circuits for the two integrators. The output voltages of the integrators are therefore maintained at substantially the levels existing immediately prior to the operation of the fade relay 758.

The positive first output voltage from the occupancy triggered integrator circuit 838, as applied to the $\rho$ gate width mixer 746 and the $\rho\Delta\theta$ gate width mixer 752, causes the gate width control signals from these circuits to vary in a direction to cause an increase in the width of the gate circuits controlled thereby. The greater the number of scans without a trigger voltage, the greater will be the increase in gate width. A tendency to fade, therefore, causes the track-while-scan system to "look at" a larger area.

Finally, the first or positive output voltage from the circuit 838 is applied to an automatic dump relay driver 802. The dump relay driver circuit is similar to the fade relay driver circuit in that it contains a tube normally biased to cut-off, but, which may be rendered conducting upon the application of a sufficiently large positive voltage thereto. The dump relay driver circuit is adjusted to fire after a predetermined number of scans without an occupancy circuit trigger pulse. The number of scans necessary is usually chosen at a greater number than that required for energization of the fade relay driver circuit. When the dump relay driver circuit fires, the automatic dump relay 328 opens its contacts and, as has been previously described, causes the search-track flip-flop circuit 302 to revert to its search condition. The track-while-scan system is thus disabled. In passing, it should also be noted that if the predicted range to the selected target, as indicated by the position of the range shaft 206, becomes less or more than the predetermined limits the cam operated dump microswitch 202 accomplishes the same return of the system to the search mode of operation.

The second, or cathode output from the occupancy triggered integrator circuit is applied to the inputs of the $|\Delta\rho|$ and the $|\Delta\theta|$ velocity damping mixer circuits 832 and 836. As has been previously pointed out, these mixer units have no function or effect during fading of the signal since there is no data at this time from which the velocity errors may be determined. The application of the second output voltage from the $\theta$ occupancy triggered integrator circuit 838 is applied to ensure that, for the scan in which the target is recaptured within the gates, the amount of velocity error damping provided by the damping mixers will be lessened from what it would otherwise be by an amount which is a function of the number of missed scans. This is accomplished by adding the negative signal from the thyratron cathode which has the same damping reducing effect on the system as would large velocity error signals.

*Summary*

It will be apparent from the foregoing description that the track-while-scan system disclosed has many desirable features. It will further be apparent that the system automatically adjusts itself to provide the optimum mode of operation for tracking conditions existing at any particular time, and ceases to track the selected target when conditions become such as to render the tracking data unreliable.

The track-while-scan system may be placed in operation to track any target which may be selected from the search radar display tube. The track-while-scan system operates servo motors which continually predict the azimuth and range of the selected target, and the predicted quantities are corrected in accordance with the observed target position. The servo motors which predict target position are controlled in accordance with the error between the predicted and the observed target positions, and the damping of the servo systems is adjusted in accordance with the past error history.

The improved track-while-scan system rejects target position information which, for one reason or another, is regarded as unreliable, and the prediction servos continue to operate at a speed determined by the last received reliable information. As set forth in the description, excessive signal strength information or received signals below a predetermined magnitude are regarded as unreliable. Should the signals fail entirely, the system will continue to track for a predetermined number of scans utilizing the last reliable data. If the target is not recaptured within the predetermined number of scans, the system automatically ceases attempts to track the target and reverts to its search mode of operation. Similarly, the track-while-scan system automatically reverts to its search mode of operation when the selected target is tracked beyond preset maximum and minimum range limits.

It will be apparent to those skilled in the art, that in the light of the above teachings the invention may be practiced other than as specifically disclosed herein. It is, therefore, to be understood that the scope of the invention is defined by the appended claims.

What is claimed is:

1. A track-while-scan channel for a search radar system in which range and azimuth information from a plurality of targets is derived through reflection of pulsed signals from said targets, comprising a manually enabled selector means for choosing a particular target for tracking by said channel, means including said selector means, a range shaft and an azimuth position shaft actuated in response to the first reflected signal pulse from said selected target subsequent to manual enabling of said selector means to set up predicted values of range and azimuth position in terms of angular rotation of the said range shaft and the said azimuth position shaft, and means responsive to subsequent reflected signal pulses from said selected target and to said predicted range and azimuth shaft positions to correct the said predicted values of range and azimuth position.

2. A track-while-scan channel for a search radar system in which range and azimuth information from a plurality of targets is derived through reflection of pulsed signals from said targets, comprising manually enabled selector means for choosing a particular target for tracking by said channel, means including said selector means, a range shaft and an azimuth position shaft actuated in response to the first reflected signal pulse from said selected target after enabling of said selector means to set up predicted values of range and azimuth positions of said selected target in terms of angular rotations of the said range shaft and the said azimuth position shaft, means generating range and azimuth gate voltages centered about said predicted range and azimuth positions, means responsive to subsequent reflected signal pulses from said selected target and to said predicted range and azimuth positions to correct said predicted positions and a pair of exponential decay integrating means responsive to successive errors between predicted and observed range and azimuth positions respectively to control the width of said range and azimuth gate voltages.

3. A track-while-scan channel for a search radar system having a search beam continually swept in azimuth and deriving range and azimuth information from a plurality of targets through reflection of pulsed signals from said targets, comprising manually enabled selector means for choosing a particular target to be tracked by said channel, azimuth gate generator means including an input shaft, means including said selector means actuated in response to the first reflected signal pulse from said selected target subsequent to manual enabling of said selector means to start said input shaft rotating in synchronism with said search beam to generate azimuth gates centered about the azimuth position of the receipt of said first reflected pulse, means responsive to angular deviations of the azimuth position of subsequent reflected pulses from said selected target with respect to the center position of said gates to adjust the position of said gate generator input shaft and exponential decay integrator means responsive to the magnitude of successive errors in azimuth position of said selected target with respect to the center of said gate voltages to adjust the width of said gate voltages.

4. A track-while-scan channel for a search radar system having a search beam continually swept in azimuth and deriving range and azimuth information from a plurality of targets through reflection of pulsed signals from said targets, comprising manually enabled selector means for choosing a particular target to be tracked by said channel, azimuth gate generator means including an input shaft, means including said selector means actuated in response to the first reflected pulse from said selected target subsequent to manual enabling of said selector means to start said input shaft rotating in synchronism with said search beam to generate azimuth gates centered about the azimuth position of the receipt of said first reflected pulse, means responsive to the velocity of angular deviations of the azimuth position of subsequent reflected pulses from said selected target from the center position of said gates to adjust the position of said gate generator input shaft and exponential decay integrator means responsive to the magnitude of successive errors in azimuth position of said selected target with respect to the center of said gate voltages to adjust the width of said gate voltages.

5. A track-while-scan channel for a search radar system having a search beam continually scanned in azimuth and deriving range and azimuth information from a plurality of targets through reflection of pulsed signals from said targets, comprising manually enabled selector means for choosing a particular target to be tracked by said channel, azimuth gate generator means including an input shaft, means including said selector means actuated in response to the first reflected signal pulse from said selected target subsequent to manual enabling of said selector means to initiate rotation of said input shaft in synchronism with said search beam whereby said gate generator will generate azimuth gates centered about the azimuth position of the receipt of the said first reflected pulse and means responsive to angular deviation of the azimuth position of subsequent reflected pulses from said selected target with respect to the center position of said gates to adjust the position of said gate generator input shaft to shift the center position of said gates to a predicted target azimuth position.

6. A track-while-scan channel for a search radar system having a search beam continuously scanned in azimuth and deriving range and azimuth information from a plurality of targets through reflection of pulsed signals from said targets, comprising manually enabled selector means for choosing a particular target to be tracked by said channel, azimuth gate generator means including an input shaft, means including said selector means actuated in response to the first reflected pulse from said selected target subsequent to manual enabling of said selector means to initiate rotation of said input shaft in synchronism with said search beam whereby said gate generator will generate azimuth gates centered about the azimuth position of the receipt of said first reflected pulse and means responsive to the velocity of angular deviation of subsequent reflected pulses from said selected target with respect to the center position of said gates to adjust the position of said gate generator input shaft to shift the center position of said gates to a predicted target azimuth position.

7. A track-while-scan channel for a search radar system which transmits timed pulses of energy in a search beam continuously scanned in azimuth and having a cathode ray tube plan-position-indicator actuated by range and azimuth information derived through reflection of the pulsed signals from targets located within the scanned area of the system, comprising a photo-electric selector means adapted to be placed over the representation of any target on the plan-position-indicator to select that particular target for tracking by said channel, means completing an enabling circuit to said photoelectric selector means so that the next reflected signal pulse from the selected target will cause a pulsed output of said selector means, a sawtooth wave generator triggered in synchronism with the transmitted pulses of energy from said search system, electronic feedback loop means responsive to the voltage of said sawtooth wave generator to produce a voltage sweeping from zero to a maximum in synchronism with the range being investigated by said search beam and means responsive to said pulsed output of said selector means to break said electronic feedback loop whereby the output voltage of said loop at the moment of breaking is representative of the range to the said selected target.

8. A track-while-scan channel according to claim 7 further including a second means responsive to the pulsed output of said selector means to connect the output voltage of said electronic feedback loop to the input of a range servo motor system at the moment of breaking of said loop.

9. A track-while-scan channel for a search radar system having a search beam continually swept in azimuth and deriving range and azimuth information from a plurality of targets by a receiver responsive to reflected pulse signals from said targets, comprising an azimuth position predicting means, manually enabled selector means responsive to the reflection of pulses from a selected target, a control transformer having a primary winding energized from a source of alternating current and a secondary winding rotatable with respect to said secondary winding, drive means for said rotatable secondary winding means responsive to actuation of said selector means to cause said drive means to rotate said secondary winding, a wide azimuth gate generator and a narrow azimuth gate generator connected to said secondary winding to be triggered by the voltage output thereof, a normally open wide azimuth gate relay and a normally open narrow azimuth gate relay energized respectively by the outputs of said wide and narrow azimuth gate generators, charging circuit means connecting the output of said receiver means to the contacts of said wide and narrow azimuth gate relays, a wide gated integrator means and a narrow gated integrator means connected to and energized through said wide and narrow gate relay contacts respectively, an occupancy relay normally connecting the contacts of the wide gated integrator means to the input of the tracking system but adapted upon energization thereof to connect the narrow gated integrator means thereto and means responsive to a predetermined output level of said narrow gated integrator means to energize said occupancy relay thereby connecting the narrow gated integrator means to the input of the said azimuth position predicting means.

10. A track-while-scan channel for a search radar system in which range and azimuth information from a plurality of targets is derived by a receiver responsive to reflected pulse signals from said targets, comprising a selector system responsive to a reflected pulse signal from a selected target to initiate tracking operation of said channel, a range gate generator and an azimuth gate generator responsive to the tracking initiating operation of the said selector system to produce gate voltages centered about the respective range and azimuth of the selected target at the moment of initiation of the operation of the tracking channel, an amplifier means for said reflected pulse signals gated by said range and azimuth gate voltages to pass only pulse signals from the selected target, means responsive to the azimuth error position of said reflected pulse signals with respect to the centers of the range and azimuth gates to shift the center positions of said gates to a predicted target azimuth position.

11. A track-while-scan channel according to claim 11, including further means for generating a signal proportional to azimuth velocity error and means for sampling the azimuth velocity error signal and means responsive to cumulative azimuth velocity errors for variably damping said azimuth gate shifting means.

12. A track-while-scan channel for a search radar system in which range and azimuth information from a plurality of targets derived through reflection of pulsed signals from said targets, selector means for choosing a particular target for tracking by said channel, amplifier means for said reflected pulsed signals, range and azimuth gate generator means placed in operation by said selector means to generate range and azimuth gate voltages centered about the initial observed range and azimuth position of said particular target and connected to said amplifier means whereby reflected pulsed signals from said particular selected target only will be passed by said amplifier means, range and azimuth error detector means connected to the output of said amplifier means for measuring any error in position of said selected target with respect to the center of the gate voltages produced by the range and azimuth gate generator means, a velocity sampling means connected to the error detector means for determining the error velocity, error velocity memory means connected to said sampling means for developing an output varying with the error velocity history and means connected to and jointly responsive to the said error detector means and the said error velocity memory means for shifting the center of said gate voltages in accordance with the predicted position of the selected target.

13. A track-while-scan channel according to claim 12, including a further means responsive to an output of said amplifier means in excess of a predetermined value to disconnect said sampling means from said error detector means.

14. A track-while-scan channel according to claim 12, including error magnitude sampling means connected to said error detector means, error magnitude memory circuit integrating means connected to the output of said error magnitude sampling means and means responsive to the output of said error magnitude memory circuit means for controlling the width of the gate voltages generated by said range and azimuth gate generators.

15. A track-while-scan channel according to claim 14, including a further means responsive to an output of said amplifier means below a predetermined level for disconnecting said error magnitude sampling means from said error detector means.

References Cited in the file of this patent

UNITED STATES PATENTS

| | | |
|---|---|---|
| 2,688,743 | Berger | Sept. 7, 1954 |
| 2,709,804 | Chance et al. | May 31, 1955 |

FOREIGN PATENTS

| | | |
|---|---|---|
| 696,847 | Great Britain | Sept. 9, 1953 |

UNITED STATES PATENT OFFICE
CERTIFICATE OF CORRECTION

Patent No. 3,064,250                      November 13, 1962

Richard N. Close

It is hereby certified that error appears in the above numbered patent requiring correction and that the said Letters Patent should read as corrected below.

Column 5, line 23, for "16" read -- 126 --; column 14, lines 1 and 2, strike out "narrow gated integrated azimuth error times signal strength"; line 17, after "strength" insert -- division --; column 18, line 49, for "the" read -- these --; line 50, after "thereof," insert -- thereby removing therefrom the output signals acquired --.

Signed and sealed this 12th day of November 1963.

(SEAL)
Attest:

ERNEST W. SWIDER                      EDWIN L. REYNOLDS

Attesting Officer                    Acting Commissioner of Patents